(12) United States Patent
Klasen-Memmer et al.

(10) Patent No.: US 7,732,022 B2
(45) Date of Patent: Jun. 8, 2010

(54) STILBENE DERIVATIVES, LIQUID-CRYSTAL MIXTURES AND ELECTRO-OPTICAL DISPLAYS

(75) Inventors: Melanie Klasen-Memmer, Heuchelheim (DE); Matthias Bremer, Darmstadt (DE); Atsutaka Manabe, Bensheim (DE)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 0 days.

(21) Appl. No.: 11/953,497

(22) Filed: Dec. 10, 2007

(65) Prior Publication Data

US 2008/0149891 A1 Jun. 26, 2008

(30) Foreign Application Priority Data

Dec. 11, 2006 (DE) .................. 10 2006 058 608

(51) Int. Cl.
| | |
|---|---|
| C09K 19/30 | (2006.01) |
| C09K 19/32 | (2006.01) |
| C09K 19/34 | (2006.01) |
| C09K 19/12 | (2006.01) |
| C07C 19/08 | (2006.01) |
| C07C 22/08 | (2006.01) |
| C07C 25/13 | (2006.01) |
| C07C 25/24 | (2006.01) |

(52) U.S. Cl. .............. 428/1.1; 252/299.61; 252/299.62; 252/299.63; 252/299.66; 570/128; 570/129; 570/130; 570/131; 570/144

(58) Field of Classification Search ............ 252/299.01, 252/299.63, 299.66, 299.61, 299.62; 428/1.1; 570/129, 130, 144, 128, 131
See application file for complete search history.

(56) References Cited

U.S. PATENT DOCUMENTS

| 4,997,942 A * | 3/1991 | Osawa et al. ................. 544/336 |
| 5,085,799 A * | 2/1992 | Shimizu et al. ........ 252/299.66 |
| 5,128,472 A * | 7/1992 | Osawa et al. ................. 544/335 |

FOREIGN PATENT DOCUMENTS

| JP | 03-004103 A | 1/1991 |
| JP | 07-133241 A | 5/1995 |

OTHER PUBLICATIONS

CAPLUS 2001:811872).*
J. Goodby et al., "*Trans*-1,2-Difluorostilbenes : Promising Materials for High Dielectric Biaxiality Ferroelectric Mixtures", Mol. Cryst. and Liq. Cryst., vol. 364 (2001) pp. 889-898.

* cited by examiner

*Primary Examiner*—Shean C Wu
(74) *Attorney, Agent, or Firm*—Millen, White, Zelano & Branigan, P.C.

(57) ABSTRACT

Disclosed are fluorostilbene compounds of formula I,

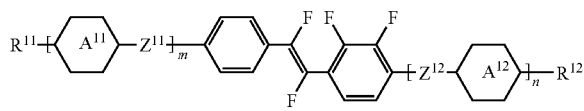

liquid-crystal media which comprise these compounds, the use of the media in electro-optical displays, in particular in VAN LCDs, and a process for the preparation of these compounds.

25 Claims, No Drawings

STILBENE DERIVATIVES, LIQUID-CRYSTAL MIXTURES AND ELECTRO-OPTICAL DISPLAYS

The present invention relates to stilbene derivatives, preferably mesogenic stilbene derivatives, in particular liquid-crystalline stilbene derivatives, and to liquid-crystalline media comprising these stilbene derivatives. The present invention furthermore relates to liquid-crystal displays, in particular active matrix addressed liquid-crystal displays (AMDs or AM LCDs), and very particularly so-called VA ("vertically aligned") liquid-crystal displays, an embodiment of ECB ("electrically controlled birefringence") liquid-crystal displays, in which nematic liquid crystals of negative dielectric anisotropy ($\Delta\epsilon$) are used.

In liquid-crystal displays of this type, the liquid crystals are used as dielectrics, whose optical properties change reversibly on application of an electric voltage. Electro-optical displays which use liquid crystals as media are known to the person skilled in the art. These liquid-crystal displays use various electro-optical effects. The commonest of these are the TN ("twisted nematic") effect, with a homogeneous, virtually planar initial alignment of the liquid-crystal director and a nematic structure which is twisted by about 90°, the STN ("super-twisted nematic") effect and the SBE ("supertwisted birefringence effect"), with a nematic structure which is twisted by 180° or more. In these and similar electro-optical effects, liquid-crystalline media of positive dielectric anisotropy ($\Delta\epsilon$) are used.

Besides the electro-optical effects mentioned, which require liquid-crystal media of positive dielectric anisotropy, there are other electro-optical effects which use liquid-crystal media of negative dielectric anisotropy, such as, for example, the ECB effect and its subforms DAP ("deformation of aligned phases"), VAN and CSH ("colour super homeotropics").

An electro-optical effect having excellent, low viewing-angle dependence of the contrast uses axially symmetrical micropixels (ASMs). In this effect, the liquid crystal of each pixel is surrounded in a cylindrical manner by a polymer material. This mode is particularly suitable for combination with addressing through plasma channels. Thus, in particular, large-area PA ("plasma addressed") LCDs having good viewing-angle dependence of the contrast can be achieved.

The IPS ("in plane switching") effect employed to an increased extent recently can use both dielectrically positive and also dielectrically negative liquid-crystal media, in a similar manner to "guest/host" displays, which can employ dyes either in dielectrically positive or dielectrically negative media, depending on the display mode used.

Since the operating voltage in liquid-crystal displays in general, i.e. also in displays utilising these effects, should be as low as possible, use is made of liquid-crystal media having a large absolute value of the dielectric anisotropy which generally predominantly and in most cases even essentially consist of liquid-crystal compounds having a dielectric anisotropy having the corresponding sign, i.e. of compounds of positive dielectric anisotropy in the case of dielectrically positive media and of compounds of negative dielectric anisotropy in the case of dielectrically negative media. In the respective types of media (dielectrically positive or dielectrically negative), at most significant amounts of dielectrically neutral liquid-crystal compounds are typically employed. Liquid-crystal compounds having the opposite sign of the dielectric anisotropy to that of the dielectric anisotropy of the medium are generally employed extremely sparingly or not at all.

The pixels of liquid-crystal displays can be addressed directly, time-sequentially, i.e. in time multiplex mode, or by means of a matrix of active elements having nonlinear electrical characteristic lines.

The commonest AMDs to date use discrete active electronic switching elements, such as, for example, three-pole switching elements, such as MOS ("metal oxide silicon") transistors or thin film transistors (TFTs) or varistors, or 2-pole switching elements, such as, for example, MIM ("metal-insulator-metal") diodes, ring diodes or "back-to-back" diodes. Various semiconductor materials, predominantly silicon, but also cadmium selenide, are used in the TFTs. In particular, amorphous silicon or polycrystalline silicon is used.

In accordance with the present application, preference is given to liquid-crystal displays having an electric field perpendicular to the liquid-crystal layer and containing liquid-crystal media of negative dielectric anisotropy ($\Delta\epsilon<0$). In these displays, the edge alignment of the liquid crystals is homeotropic. In the fully switched-on state, i.e. on application of an electric voltage of appropriate magnitude, the liquid-crystal director is aligned parallel to the layer plane.

Dielectrically positive, fluorinated difluorostilbenes of the following formula

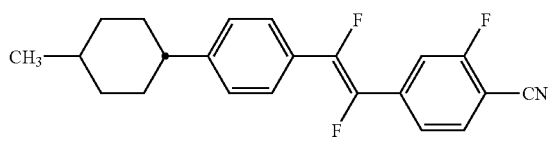

are described in JP 03-041 03 (A), and dielectrically positive, fluorinated difluorostilbenes, such as, for example,

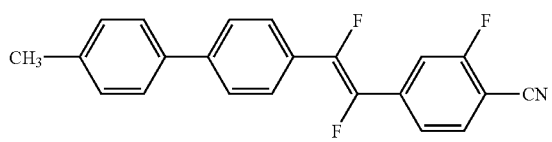

are described in JP 03-041 03 (A).

Fluorinated difluorostilbenes of the following formula

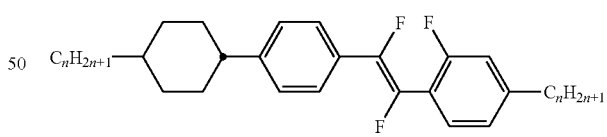

are described in JP 07-133 241(A).

Fluorinated difluorostilbenes of the following formula

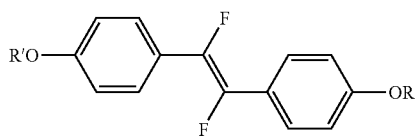

are described in Goodby, J. W. et al., Molecular Crystals and Liquid Crystals, Volume 364 (2001) page 889.

However, these fluorinated difluorostilbenes have a positive or at best weakly negative dielectric anisotropy.

Development in the area of liquid-crystalline materials is still far from complete. In order to improve the properties of liquid-crystalline display elements, attempts are constantly being made to develop novel compounds which enable optimisation of displays of this type.

It is therefore an object of the present invention to provide compounds having advantageous properties for use in liquid-crystalline media. They should preferably have negative dielectric anisotropy (Δε<0), which makes them particularly suitable for use in liquid-crystalline media for VA displays.

In order to ensure satisfactory properties, in particular low characteristic voltages, for example in VA-TFT displays, substances having a large absolute value of the dielectric anisotropy (Δε), a value of the optical anisotropy (Δn) which corresponds to the particular application, are required.

This is achieved through the use of the compounds of the formula I according to the invention

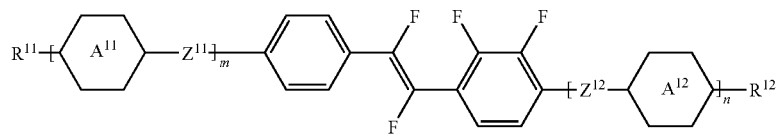

I in which

R$^{11}$ and R$^{12}$ each, independently of one another, denote H, halogen, an alkyl group having 1 to 15 C atoms which is monosubstituted by CN or CF$_3$ or at least monosubstituted by halogen, where, in addition, one or more CH$_2$ groups, in each case independently of one another, may be replaced by —O—, —S—, —CH=CH—, —CF=CF—, —CF=CH—, —CH=CF—,

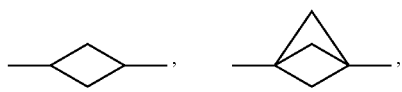

—CO—, —CO—O—, —O—CO— or —O—CO—O— in such a way that neither O nor S atoms are linked directly to one another, preferably one of R$^{11}$ and R$^{12}$, preferably both R$^{11}$ and R$^{12}$ each, independently of one another, denote(s) alkyl or alkoxy having 1 to 12 C atoms, alkoxyalkyl, alkenyl or alkenyloxy having 2 to 12 C atoms and the other, independently of the first, likewise denotes alkyl or alkoxy having 1 to 12 C atoms, alkoxyalkyl, alkenyl or alkenyloxy having 2 to 12 C atoms, particularly preferably R$^{11}$ denotes alkyl or alkenyl, and R$^{12}$ denotes alkoxy or alkenyloxy, preferably alkoxy,

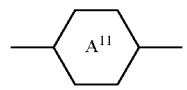

and

each, independently of one another and, if present more than once, also these independently of one another, denote (a) a trans-1,4-cyclohexylene radical, in which, in addition, one or two non-adjacent CH$_2$ groups may be replaced by —O— and/or —S—, (b) a 1,4-cyclohexenylene radical, (c) a 1,4-phenylene radical, in which, in addition, one or two non-adjacent CH groups may be replaced by N, or (d) a radical selected from the group naphthalene-2,6-diyl, decahydronaphthalene-2,6-diyl and 1,2,3,4-tetrahydronaphthalene-2,6-diyl, or (e) a radical selected from the group 1,4-bicyclo[2.2.2] octylene, 1,3-bicyclo[1.1.1]pentylene and spiro[3.3] heptane-2,6-diyl, wherein (a) and (b), one or more —CH$_2$— groups, independently of one another, may each be replaced by a —CHF— or —CF$_2$— group, and in (c) and (d), one or more —CH= groups, independently of one another, may each be replaced by a group selected from the group —C(F)=, —C(Cl)=, —C(Br)=, —C(CN)=, —C(CH$_3$)=, —C(CH$_2$F)=, —C(CHF$_2$)=, —C(OCH$_3$)=, —C(OCHF$_2$)= and —C(OCF$_3$)=, preferably a —CF= group, and preferably denote

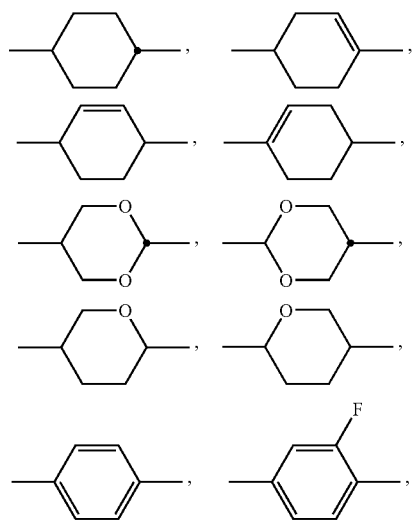

-continued

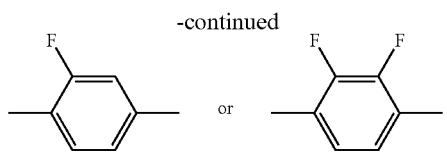

particularly preferably

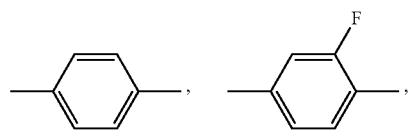

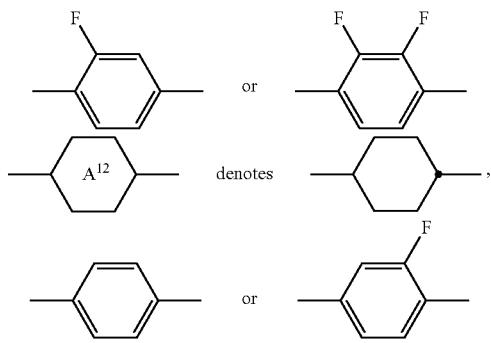

$Z^{11}$ and $Z^{12}$ each, independently of one another and, if present more than once, also these independently of one another, denote a single bond, —CH$_2$—CH$_2$—, —CF$_2$—CH$_2$—, —CH$_2$—CF$_2$—, —CF$_2$—CF$_2$—, —CH═CH—, —CF═CF—, —CF═CH—, —CH═CF—, —C≡C—, —COO—, —OCO—, —CH$_2$O—, —OCH$_2$—, —CF$_2$O—, —OCF$_2$—, or a combination of two of these groups, where no two O atoms are bonded to one another, preferably —(CH$_2$)$_4$—, —CH$_2$—CH$_2$—, —CF$_2$—CF$_2$—, —CH═CH—, —CF═CF—, —C≡C—, —CH$_2$O—, —CF$_2$O— or a single bond, particularly preferably —CH$_2$O—, —CH$_2$—CH$_2$—, —CF$_2$—CF$_2$—, —CF═CF—, —CF$_2$O— or a single bond, and m and n each, independently of one another, denote 0, 1 or 2, preferably 0 or 1, where (m+n) denotes 0, 1 or 2, preferably 0 or 1, particularly preferably 1.

The compounds of the formula I according to the invention are preferably mesogenic compounds and particularly preferably liquid-crystalline compounds, the compounds particularly preferably having a nematic phase.

The compounds of the formula I according to the invention are particularly preferably selected from the sub-formulae I-1 to I-3, particularly preferably I-3:

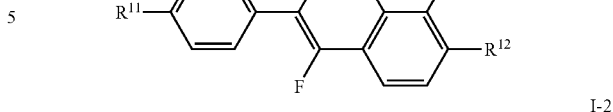

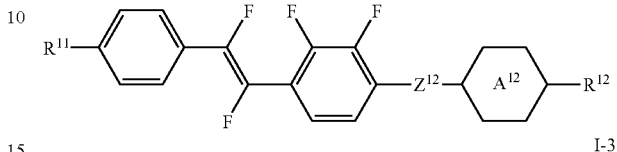

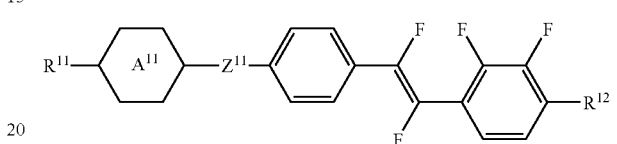

in which the parameters have the meaning given above under formula I, and preferably $Z^{11}$ and $Z^{12}$ denote a single bond and in formulae I-1 and I-3

$R^{11}$ denotes alkyl or alkenyl and $R^{12}$ denotes alkoxy or alkenyloxy, preferably alkoxy, in formula I-2

$R^{11}$ denotes alkoxy or alkenyloxy, preferably alkoxy, and $R^{12}$ denotes alkyl or alkenyl.

Particular preference is given to compounds of the formula I-3 having one or more of the formulae selected from the group of formulae I-3a and I-3b:

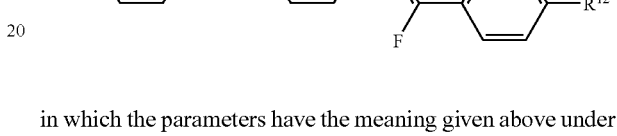

in which the parameters have the respective meaning given above, and preferably $R^{11}$ denotes alkyl or alkenyl, and $R^{12}$ denotes alkoxy or alkenyloxy, preferably alkoxy.

Compounds of the formula I containing branched wing groups $R^{11}$ and/or $R^{12}$ may occasionally be of importance owing to better solubility in the usual liquid-crystalline base materials, but in particular as chiral dopants if they are optically active. Smectic compounds of this type are suitable as components of ferroelectric materials. Compounds of the formula I having $S_A$ phases are suitable, for example, for thermally addressed displays.

If $R^{11}$ and/or $R^{12}$ denote an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl or alkoxyalkyl preferably denotes straight-chain 2-oxapropyl(=methoxymethyl), 2-(=ethoxymethyl) or 3-oxabutyl(=2-methoxyethyl), 2-, 3- or 4-oxapentyl, 2-, 3-, 4- or 5-oxahexyl, 2-, 3-, 4-, 5- or 6-oxaheptyl, 2-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If $R^{11}$ and/or $R^{12}$ denote an alkyl radical in which one $CH_2$ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-1 -5- or -6-enyl, oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl.

If $R^{11}$ and/or $R^{12}$ denote an alkyl radical in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have 2 to 6 C atoms. Accordingly, they denote, in particular, acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxy-carbonyl)ethyl, 2-(propoxycarbonyl)ethyl, 3-(methoxycarbonyl)propyl, 3-(ethoxycarbonyl)propyl or 4-(methoxycarbonyl)butyl.

If $R^{11}$ and/or $R^{12}$ denote an alkyl radical in which one $CH_2$ group has been replaced by unsubstituted or substituted —CH=CH— and an adjacent $CH_2$ group has been replaced by CO or CO—O or O—CO, this may be straight-chain or branched. It is preferably straight-chain and has 4 to 13 C atoms. Accordingly, it denotes, in particular, acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If $R^{11}$ and/or $R^{12}$ denote an alkyl or alkenyl radical which is monosubstituted by CN or $CF_3$, this radical is preferably straight-chain. The substitution by CN or $CF_3$ is in any desired position.

If $R^{11}$ and/or $R^{12}$ denote an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Branched groups generally contain not more than one chain branch. Preferred branched radicals R are isopropyl, 2-butyl(=1-methylpropyl), isobutyl(=2-methylpropyl), 2-methylbutyl, isopentyl(=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy and 1-methylheptyloxy.

If $R^{11}$ and/or $R^{12}$ represent an alkyl radical in which two or more $CH_2$ groups have been replaced by —O— and/or —CO—O—, this may be straight-chain or branched. It is preferably branched and has 3 to 12 C atoms. Accordingly, it denotes, in particular, biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)-butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl, 5,5-bis(ethoxycarbonyl)pentyl and 6,6-bis(ethoxycarbonyl)hexyl.

Particular preference is given to compounds of the formula I in which n=0 or 1 and m=0 or 1 and $R^{11}$ denotes methyl, ethyl, propyl, butyl, pentyl, vinyl, 1E-propenyl, 1E-butenyl or 1E-pentenyl, and to media comprising these compounds. Of these compounds, the alkyl-substituted compounds are particularly preferably employed.

The compounds of the formula I are synthesised in accordance with the following scheme (scheme I).

Scheme I: Synthesis of the compounds of the formula I

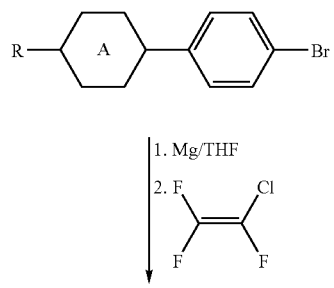

-continued

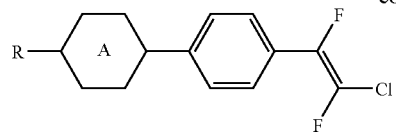 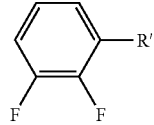

1. BuLi/THF/-100° C.
2. B(OMe)₃
3. H₃O⁺

1. BuLi/THF/-70° C.
2. I₂

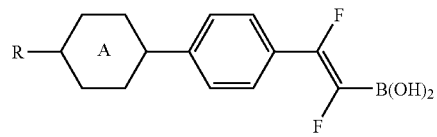 + 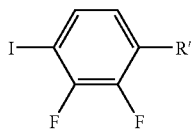

Pd cat.

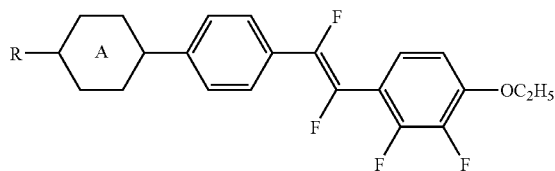

in which, unless explicitly indicated otherwise, A has the meaning given above for $A^{11}$ and additionally may also be a single bond, and R and R' have the respective meanings given above for $R^{11}$ and $R^{12}$ respectively.

Examples of structures of preferred compounds of the formula I are given below:

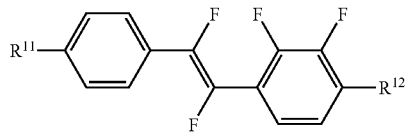

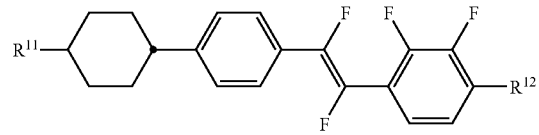

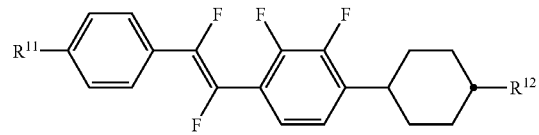

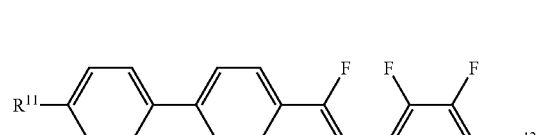

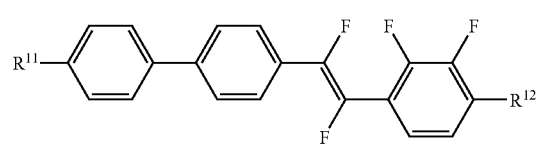

-continued

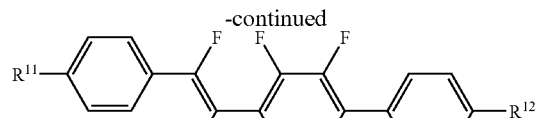

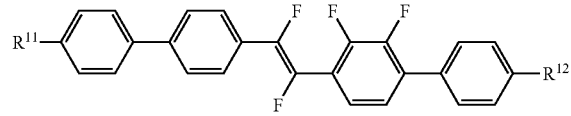

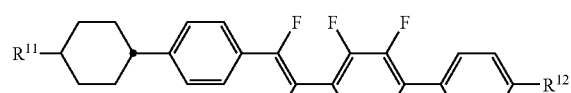

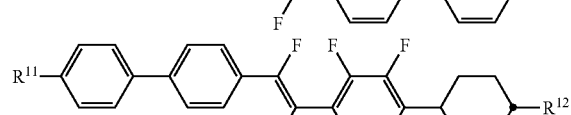

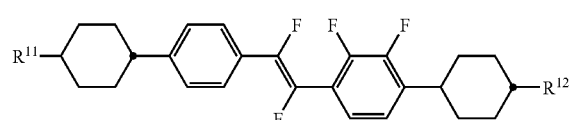

in which the parameters have the meaning given above.

Owing to their molecular structure, compounds of the formula I according to the invention may be chiral and can accordingly occur in various enantiomeric forms. They can therefore be in racemic or optically active form.

The present invention also relates to liquid-crystal media which comprise one or more compound(s) of the formula I.

In a preferred embodiment, the liquid-crystal media in accordance with the present invention comprise a) one or more dielectrically negative compound(s) of the formula I

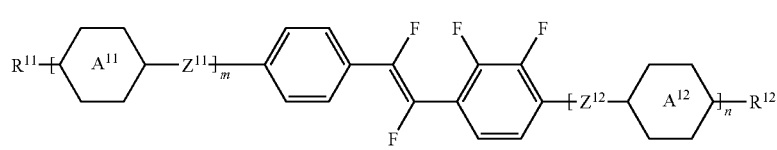

in which the parameters have the meaning given above, b) optionally one or more dielectrically negative compound(s) of the formula II

in which $R^{21}$ and $R^{22}$ each, independently of one another, have the meaning given above for $R^{11}$ under formula I, $Z^{21}$ and $Z^{22}$ each, independently of one another, have the meaning given above for $Z^{11}$ under formula I, at least one of the rings

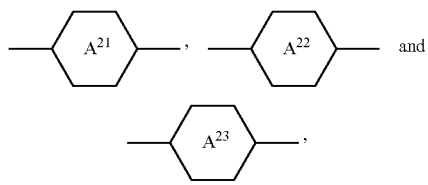

preferably

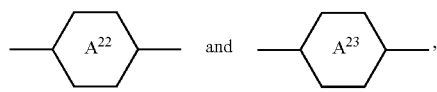

present denotes

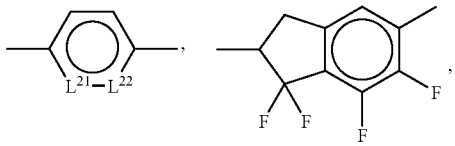

-continued

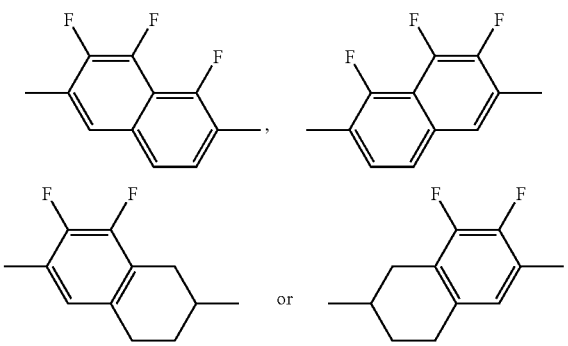

and the others, in each case independently of one another, denote

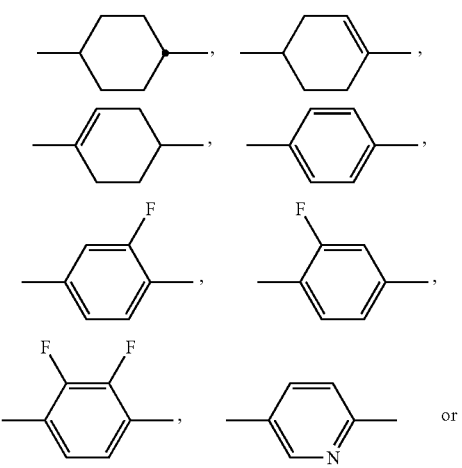

-continued

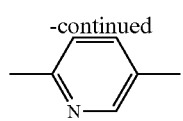

preferably

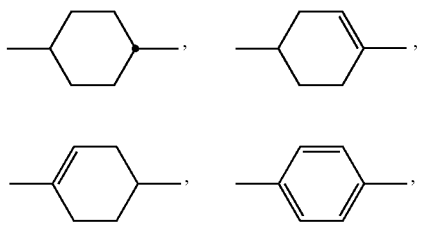

-continued

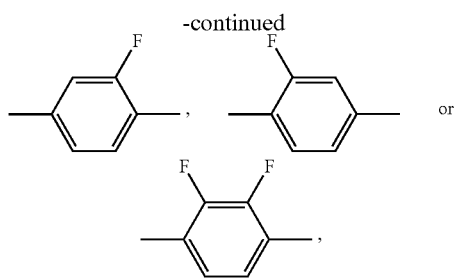

particularly preferably

denotes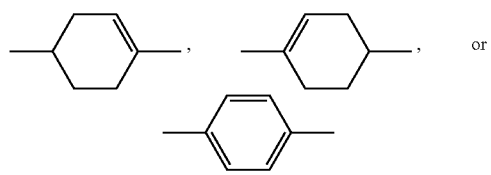

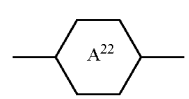

if present, denotes

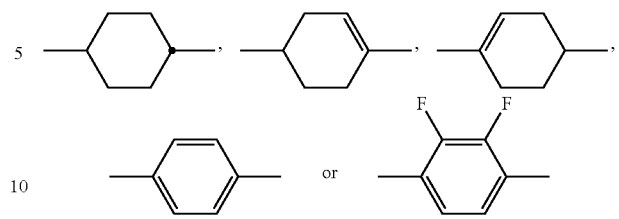

$L^{21}$ and $L^{22}$ both denote C—F or one of the two denotes N or C—Cl and the other denotes C—F, preferably both denote C—F, and I denotes 0, 1 or 2, preferably 0 or 1, and c) optionally one or more dielectrically neutral compound(s) of the formula III

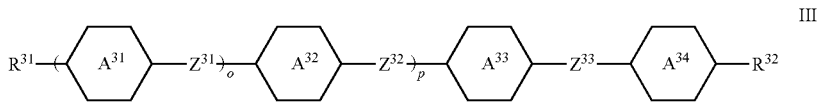

III in which $R^{31}$ and $R^{32}$ each, independently of one another, have the meaning given above for $R^1$ under formula I. and $Z^{31}$, $Z^{32}$ and $Z^{33}$ each, independently of one another, denote —CH$_2$CH$_2$—, —CH=CH—, —COO— or a single bond,

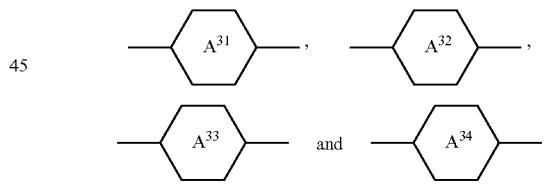

each, independently of one another, denote

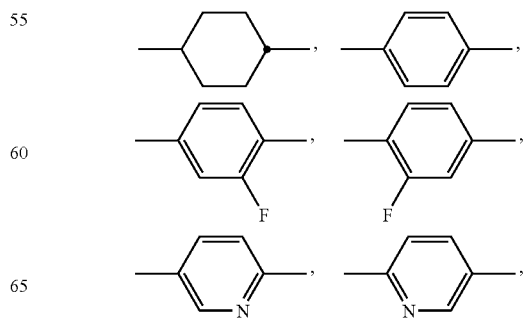

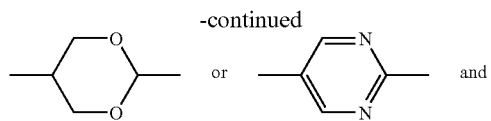

o and p, independently of one another, denote 0 or 1, but preferably $R^{31}$ and $R^{32}$ each, independently of one another, denote alkyl or alkoxy having 1-5 C atoms or alkenyl having 2-5 C atoms,

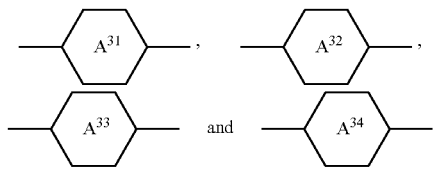

each, independently of one another, denote

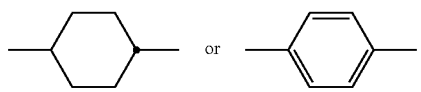

and very particularly preferably at least two of these rings denote

where two adjacent rings are very particularly preferably linked directly and preferably denote

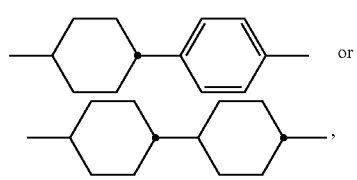

where one or more H atoms in the phenylene ring may be replaced, independently of one another, by F or CN, preferably by F, and one or two non-adjacent $CH_2$ groups of the cyclohexylene ring or one of the cyclohexylene rings may be replaced by O atoms.

The liquid-crystal medium preferably comprises one or more compounds of one or more of the formulae selected from the group of the following formulae II-1 to II-3:

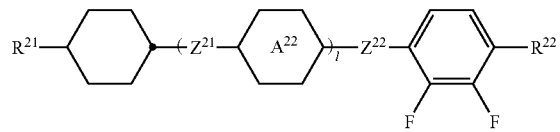

II-1

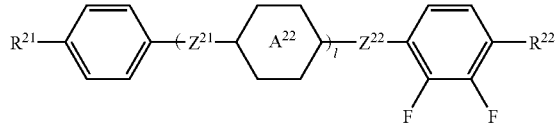

II-2

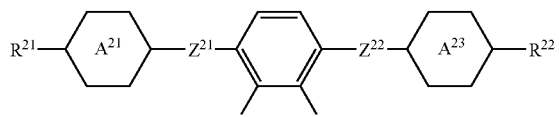

II-3 in which $R^{21}, R^{22}, Z^{12}, Z^{22}$,

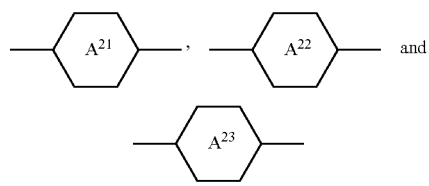

and l each have the meaning given above under formula II. Preferably, $R^{21}$ is alkyl, preferably having 1-5 C atoms, $R^{21}$ is alkyl or alkoxy, preferably each having 1 to 5 C atoms, and $Z^{22}$ and $Z^{21}$, if present, are a single bond.

The liquid-crystal medium particularly preferably comprises one or more compounds selected from the group of the compounds of the following sub-formulae II-1a to II-1e, II-2a to II-2c and II-3a and II-3b, preferably one or more of the formulae selected from the group of the formulae II-1a, II-1c and II-2b and/or II-1d, II-1e and II-2c:

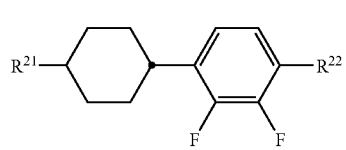

II-1a

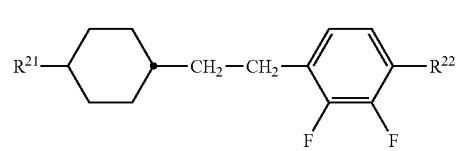

II-1b

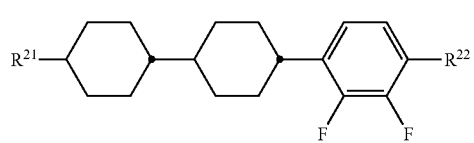

II-1c

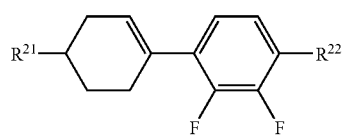

II-1d

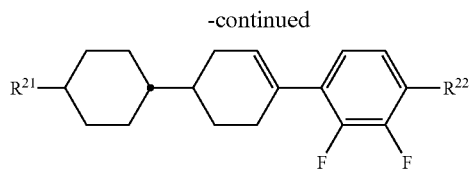
II-1e

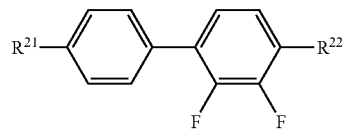
II-2a

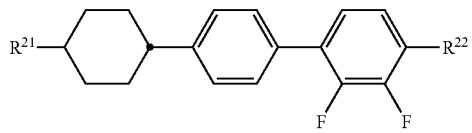
II-2b

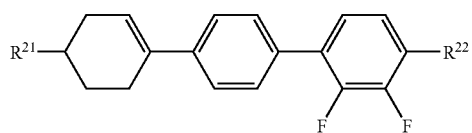
II-2c

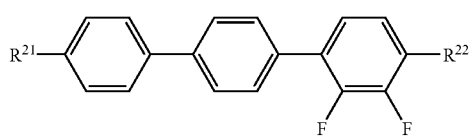
II-3a

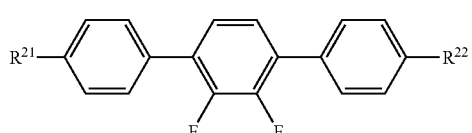
II-3b in which the parameters have the meaning given above, and preferably $R^{21}$ denotes alkyl or alkenyl, particularly preferably alkyl, and $R^{22}$ denotes alkyl or alkoxy.

In a further preferred embodiment, the liquid-crystal medium comprises one or more compounds of one or more of the formulae selected from the group of the following formulae II-4 and II-5:

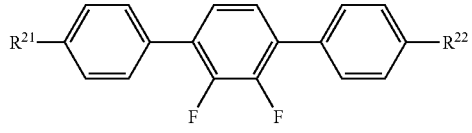
II-4

II-5 in which the parameters each, independently of one another, have one of the meanings indicated above, but $R^{22}$ is not H.

In a further preferred embodiment, the liquid-crystal medium comprises one or more compounds which contain a tetrahydronaphthyl or naphthyl unit, such as, for example, the compounds of one or more of the formulae selected from the group of the following formulae II-6 to II-10:

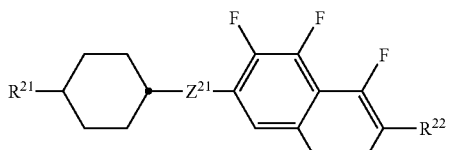
II-6

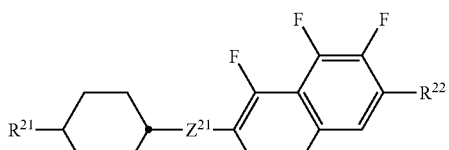
II-7

II-8

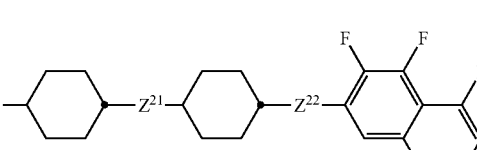

II-9

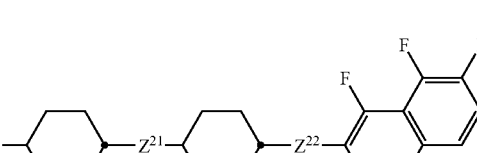

II-10

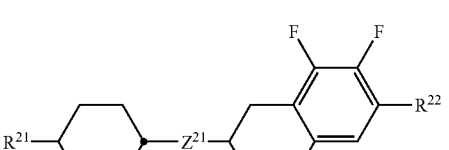

in which the parameters each, independently of one another, have one of the meanings indicated above.

Preferred mixtures comprise one or more difluorodibenzochroman compounds of the formula BC and/or chromans of the formula CR

BC

CR in which $R^{B1}$, $R^{B2}$, $R^{CR1}$ and $R^{CR2}$ each, independently of one another, have the meaning of $R^{11}$, preferably in amounts of 3 to 20% by weight, in particular in amounts of 3 to 15% by weight.

Particularly preferred compounds of the formulae BC and CR are compounds BC-1 to BC-7 and CR-1 to CR-5:

BC-1
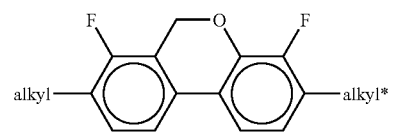

BC-2
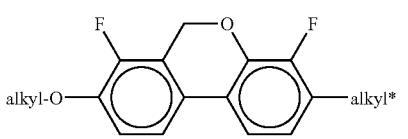

BC-3
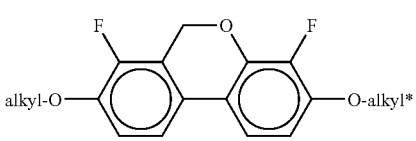

BC-4
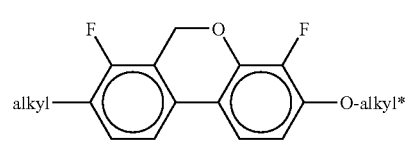

BC-5
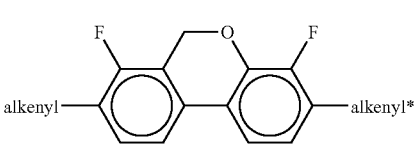

BC-6
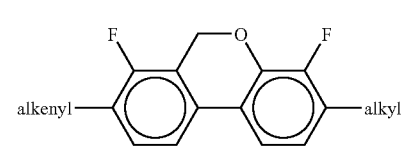

BC-7
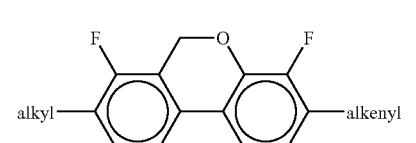

CR-1
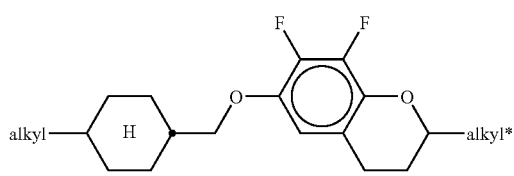

CR-2
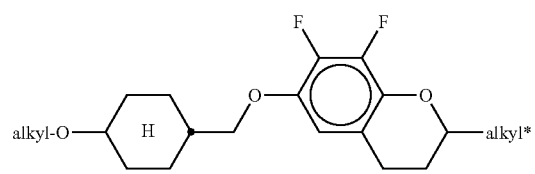

-continued

CR-3
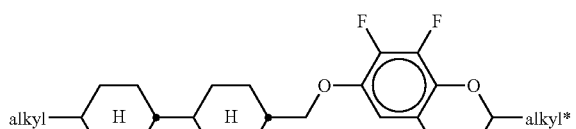

CR-4

CR-5
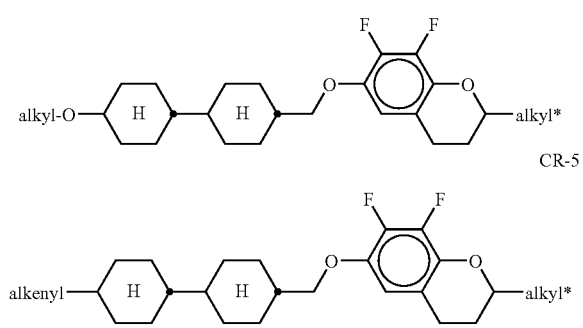

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

Very particular preference is given to mixtures comprising one, two or three compounds of the formula BC-2.

In a further preferred embodiment, the liquid-crystal medium comprises one or more compounds which contain a chlorofluoro-1,4-phenylene ring, preferably one or more compounds of one or more of the formulae selected from the group of the following formulae II-11 to II-15:

II-11
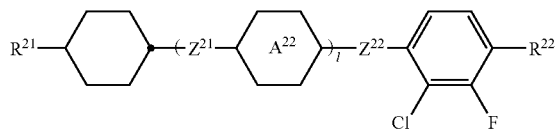

II-12
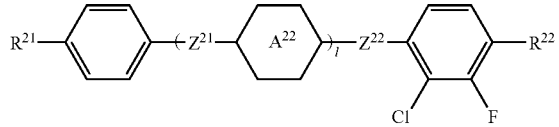

II-13

II-14
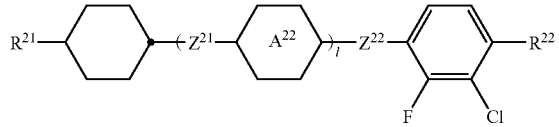

II-15

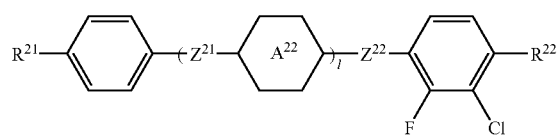

in which the parameters each, independently of one another, have one of the meanings indicated above.

In a particularly preferred embodiment, the liquid-crystal medium comprises one or more compounds of one or more of the formulae selected from the group of the following formulae II-11a to II-15b:

II-11a
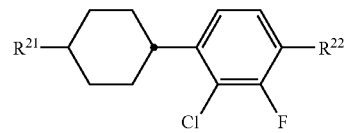

II-11b
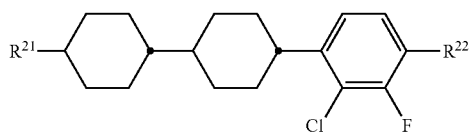

II-12a
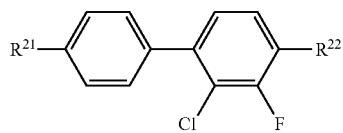

II-12b
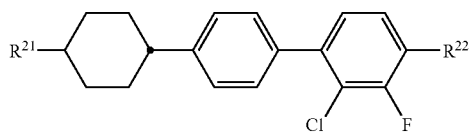

II-12c
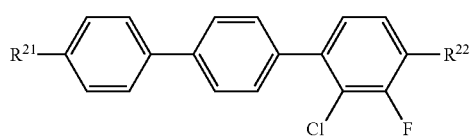

II-13a
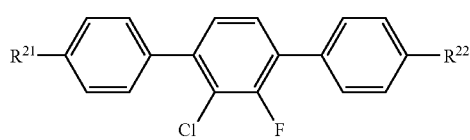

II-14a
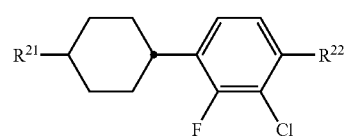

II-14b
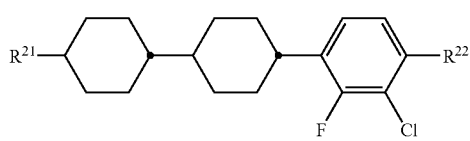

II-15a
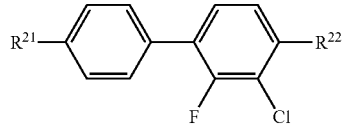

II-15b
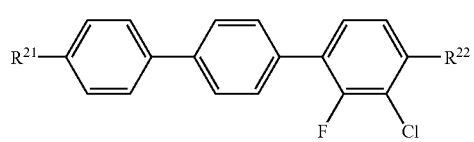

in which the parameters have the meaning given above.

The liquid-crystal medium particularly preferably comprises one or more compounds of one or more of the formulae selected from the group of the formulae III-1 to III-3:

III-1
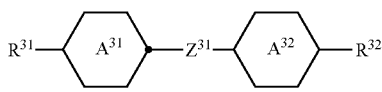

III-2
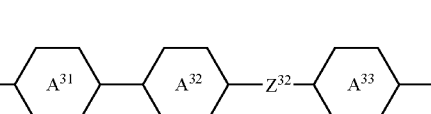

III-3
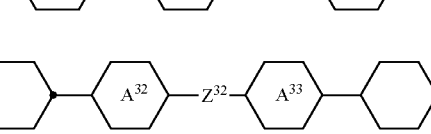

in which $R^{31}$, $R^{32}$, $Z^{31}$, $Z^{32}$,

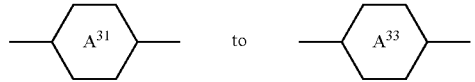

each have the meaning indicated above under formula III.

The liquid-crystal medium especially preferably comprises one or more compounds of one or more of the formulae selected from the group of the formulae III-1a to III-1d and/or III-1e and III-1f and/or III-2a to III-2h, III-3a to III-3d:

III-Ia
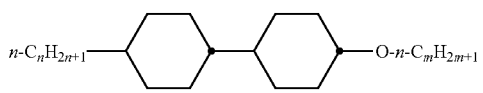

III-1b
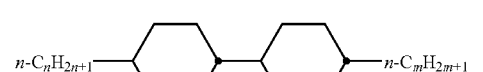

III-1c

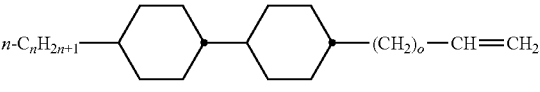

-continued

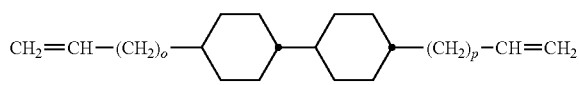
III-1d in which n and m each, independently of one another, denote 1 to 5, and o and p each, independently both thereof and also of one another, denote 0 to 3,

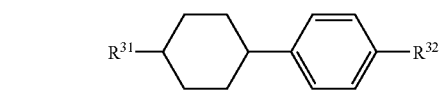
III-1e

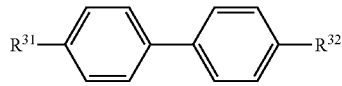
III-1f

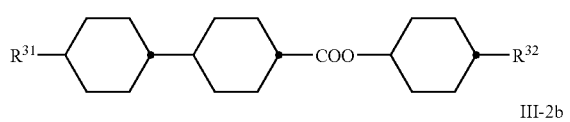
III-2a

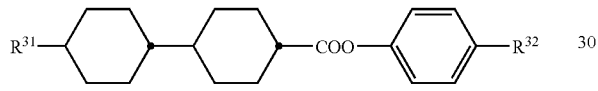
III-2b

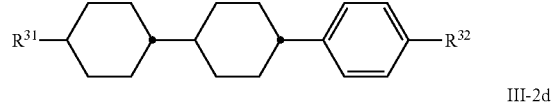
III-2c

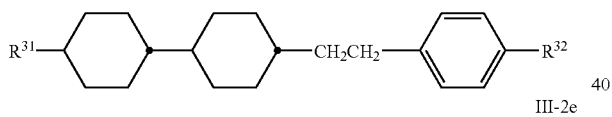
III-2d

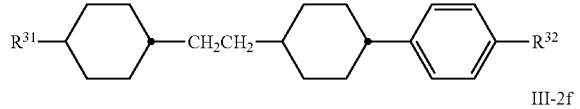
III-2e

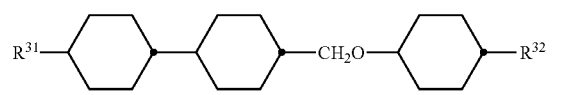
III-2f

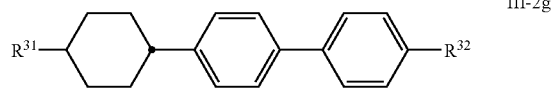
III-2g

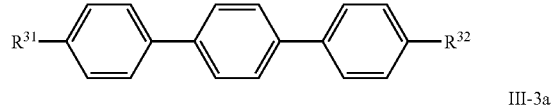
III-2h

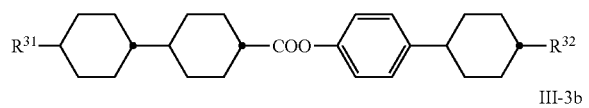
III-3a

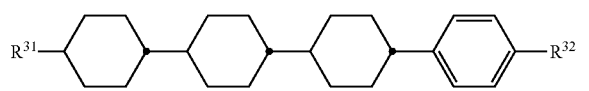
III-3b

III-3c

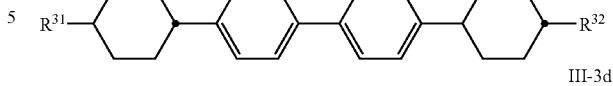
III-3d

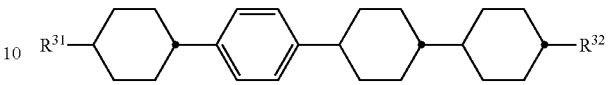

in which $R^{31}$ and $R^{33}$ each have the meaning indicated above under formula III, preferably the meaning indicated under formula III-1, and the phenylene rings, in particular in compounds III-2g, III-2h and III-3c, may optionally be fluorinated, but not in such a way that the compounds are identical with those of the formula II and the sub-formulae thereof. Preferably, $R^{31}$ is n-alkyl having 1 to 5 C atoms, particularly preferably having 1 to 3 C atoms, and $R^{32}$ is n-alkyl or n-alkoxy having 1 to 5 C atoms or alkenyl having 2 to 5 C atoms. Of these, particular preference is given to compounds of the formulae III-1a to III-1d.

Preferred fluorinated compounds of the formulae III-2g, III-2h and III-3c are the compounds of the formulae III-2g', III-2h' and III-3c':

III-2g'
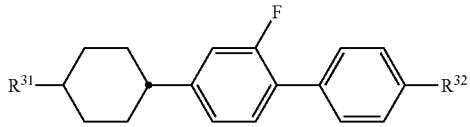

III-2h'
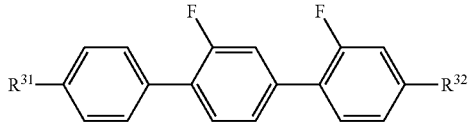

III-3c'
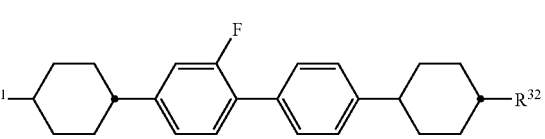

in which $R^{31}$ and $R^{33}$ each have the meaning indicated above under formula III, preferably the meaning indicated under formula III-2g, III-2h or III-3c, and $R^{32}$ in formula III-2h' preferably denotes F.

The media according to the invention preferably have a birefringence of 0.11 or more.

The media according to the invention preferably have a dielectric anisotropy of −2 or less.

The media according to the invention preferably comprise compounds of the formula I in concentrations of 5% to 25%, preferably of 5% to 15%, per homologous compound, and of the formula II-1a and/or II-2a in concentrations of 2% to 30%, preferably of 5% to 15%, per homologous compound, and of 5% up to 60% in total, and/or of the formula II-1c in which $R^{21}$ denotes alkyl and $R^{22}$ denotes alkoxy and/or II-2b in concentrations of 2% to 20%, preferably of 5% to 12%, per homologous compound, and of 5% to 60% in total, and/or of the formula II-1c in which $R^{21}$ and $R^{22}$ denote alkyl in concentrations of 2% to 20%, preferably of 5% to 15%, per homologous compound, and/or II-3a in concentrations of 2% to 15%, preferably of 5% to 10%, per homologous compound, and/or II-3b in concentrations of 2% to 20%, preferably of 5% to 15%, per homologous compound, and of 5% to 40% in total, and/or of the formula III in concentrations of 5% to 80%, preferably of 10% to 60%.

In the present application, the term compounds is taken to mean both one compound and a plurality of compounds, unless expressly stated otherwise.

The liquid-crystal media according to the invention preferably have nematic phases of in each case from at least −20° C. to 80° C., preferably from −30° C. to 90° C. and very particularly preferably from −40° C. to 100° C. The term "have a nematic phase" here is taken to mean firstly that no smectic phase and no crystallisation are observed at low temperatures at the corresponding temperature and secondly also that no clearing occurs on heating from the nematic phase. The investigation at low temperatures is carried out in a flow viscometer at the corresponding temperature and checked by storage in test cells having a layer thickness corresponding to the electro-optical application for at least 1000 hours. At high temperatures, the clearing point is measured in capillaries by conventional methods.

Furthermore, the liquid-crystal media according to the invention are characterised by low optical anisotropy values.

The term "alkyl" preferably encompasses straight-chain and branched alkyl groups having 1 to 7 carbon atoms, in particular the straight-chain groups methyl, ethyl, propyl, butyl, pentyl, hexyl and heptyl. Groups having 2 to 5 carbon atoms are generally preferred.

The term "alkenyl" preferably encompasses straight-chain and branched alkenyl groups having 2 to 7 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluoro-butyl, 5-fluoropentyl, 6-fluorohexyl and 7-fluoroheptyl. However, other positions of the fluorine are not excluded.

The term "oxaalkyl" or "alkoxyalkyl" preferably encompasses straight-chain radicals of the formula $C_nH_{2n+1}$—O—$(CH_2)_m$, in which n and m each, independently of one another, denote 1 to 6. Preferably, n is 1 and m is 1 to 6.

Compounds containing a vinyl end group and compounds containing a methyl end group have low rotational viscosity.

In the present application, the term dielectrically positive compounds denotes compounds having a $\Delta\epsilon$ of >1.5, the term dielectrically neutral compounds denotes those in which $-1.5 \leq \Delta\epsilon \leq 1.5$, and the term dielectrically negative compounds denotes those having a $\Delta\epsilon$ of <−1.5. The dielectric anisotropy of the compounds is determined here by dissolving 10% of the compounds in a liquid-crystalline host and determining the capacitance of this mixture at 1 kHz and a temperature of 20° C. in at least one test cell with a layer thickness of about 20 μm having a homeotropic surface alignment and at least one test cell with a layer thickness of about 20 μm having a homogeneous surface alignment. The measurement voltage is typically 0.5 V to 1.0 V, but is always less than the capacitive threshold of the respective liquid-crystal mixture.

The host mixture used for determining the applicationally relevant physical parameters is ZLI-4792 from Merck KGaA, Germany. As an exception, the determination of the dielectric anisotropy of dielectrically negative compounds is carried out using ZLI-2857, likewise from Merck KGaA, Germany. The values for the respective compound to be investigated are obtained from the change in the properties, for example the dielectric constants, of the host mixture after addition of the compound to be investigated and extrapolation to 100% of the compound employed.

The concentration of the compound to be investigated that is employed in the host mixture is generally 10%. If the solubility of the compound to be investigated is inadequate for this purpose, the concentration employed is, by way of exception, halved, i.e. reduced to 5%, 2.5%, etc., until the concentration is below the solubility limit.

The term threshold voltage usually relates to the optical threshold for 10% relative contrast ($V_{10}$). In relation to the liquid-crystal mixtures of negative dielectric anisotropy, however, the term threshold voltage is used in the present application for the capacitive threshold voltage ($V_0$), also known as the Freedericksz threshold, unless explicitly stated otherwise. In the case of the liquid-crystal media of negative dielectric anisotropy, the threshold voltage was determined as the capacitive threshold $V_0$ in cells with a liquid-crystal layer homeotropically aligned by means of the polyimide SE-1211 from Nissan Chemicals, Japan.

All concentrations in this application, unless explicitly stated otherwise, are indicated in per cent by weight and relate to the corresponding mixture as a whole. All physical properties are and have been determined in accordance with "Merck Liquid Crystals, Physical Properties of Liquid Crystals", status November 1997, Merck KGaA, Germany, and apply to a temperature of 20° C., unless explicitly stated otherwise. $\Delta n$ is determined at 589 nm and $\Delta\epsilon$ at 1 kHz.

The liquid-crystal media according to the invention may, if necessary, also comprise further additives and optionally also chiral dopants in the conventional amounts. The amount of these additives employed is in total 0% to 10%, based on the amount of the mixture as a whole, preferably 0.1% to 6%. The concentrations of the individual compounds employed are in each case preferably 0.1 to 3%. The concentration of these and similar additives is not taken into account when indicating the concentrations and the concentration ranges of the liquid-crystal compounds in the liquid-crystal media.

The compositions consist of a plurality of compounds, preferably 3 to 30, particularly preferably 6 to 20 and very particularly preferably 10 to 16 compounds, which are mixed in a conventional manner In general, the desired amount of the components used in lesser amount is dissolved in the components making up the principal constituent, advantageously at elevated temperature. If the selected temperature is above the clearing point of the principal constituent, the completion of the dissolution process is particularly easy to observe. However, it is also possible to prepare the liquid-crystal mixtures in other conventional ways, for example using premixes or from a so-called "multibottle" system.

By means of suitable additives, the liquid-crystal phases according to the invention can be modified in such a way that they can be employed in any type of display and in particular of ECB display and IPS display that has been disclosed hitherto.

The examples below serve to illustrate the invention without representing a restriction. In the examples, the melting point T(C,N), the transition from the smectic (S) phase to the nematic (N) phase T(S,N) and the clearing point T(N,I) of a liquid-crystal substance are indicated in degrees Celsius. The various smectic phases are characterised by corresponding suffixes.

The percentages above and below are, unless explicitly stated otherwise, per cent by weight, and the physical properties are the values at 20° C., unless explicitly stated otherwise.

All the temperature values indicated in this application are ° C., and all temperature differences are correspondingly differential degrees, unless explicitly stated otherwise.

In the synthesis examples and schemes, the abbreviations have the following meanings, unless explicitly stated otherwise:

Ac acetate,
THF tetrahydrofuran,
Bu butyl,
Me methyl,
m.p. melting point,
soln. solution,
sat. saturated,
$H_3O^+$ acidify and
RT room temperature (about 22° C.).

In the present application and in particular in the following examples, the structures of the liquid-crystal compounds are indicated by means of abbreviations, also acronyms, where the transformation into chemical formulae takes place using the following Tables A to C. All radicals $C_nH_{2n+1}$, $C_mH_{2m+1}$ and $C_lH_{2l+1}$ are straight-chain alkyl radicals having n, m and l C atoms respectively. All radicals $C_nH_{2n-1}$, $C_mH_{2m-1}$, and $C_lH_{2l-1}$ are straight-chain alkenyl radicals, preferably 1E-alkenyl radicals, having n, m and l C atoms respectively. In Table A, only the abbreviation parts for the ring elements of the parent structure of the compounds are indicated. Table B shows the bridging groups. Table C lists the meanings of the abbreviations of the left-hand and right-hand end groups of the compounds. The abbreviation of the compounds is obtained as follows. Firstly, the parent structure is written by means of the corresponding letters. The abbreviation of the left-hand end group is added to the abbreviation of the parent structure between two hyphens, followed by the abbreviation of the right-hand end group after the second hyphen. Finally, Table D shows illustrative abbreviations of common compounds, which are also preferably employed in accordance with the present invention, together with their structural forms.

TABLE A

Ring elements

C

L

LI

TABLE A-continued

Ring elements

D

DI

A

AI

P

G

GI

U

UI

Y

K

TABLE A-continued

Ring elements

| | |
|---|---|
| Np | (2,6-naphthalene) |
| Nf2l | (1,2-difluoronaphthalene-2,6-diyl, isomer) |
| Nf2 | (1,2-difluoronaphthalene-2,6-diyl) |
| Nf3 | (1,2,3-trifluoronaphthalene-2,6-diyl) |
| Nf3I | (1,2,3-trifluoronaphthalene-2,6-diyl, isomer) |
| tH | (tetrahydronaphthalene-2,6-diyl) |
| tHI | (tetrahydronaphthalene-2,6-diyl, isomer) |
| tHf2 | (difluorotetrahydronaphthalene-2,6-diyl) |
| tHf2I | (difluorotetrahydronaphthalene-2,6-diyl, isomer) |
| dH | (decahydronaphthalene-2,6-diyl) |

TABLE B

Bridging groups

| | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| W | —CF=CF— | Q | —CF$_2$—O— |
| T | —C≡C— | QI | —O—CF$_2$— |

TABLE C

End groups

| Left-hand group | | Right-hand group | |
|---|---|---|---|
| \multicolumn{4}{c}{Abbreviations used individually} | | | |
| -n- | C$_n$H$_{2n+1}$— | -n | —C$_n$H$_{2n+1}$ |
| -nO— | C$_n$H$_{2n+1}$O— | -nO | —OC$_n$H$_{2n+1}$ |
| —V— | CH$_2$=CH— | —V | —CH=CH$_2$ |
| -nV— | C$_n$H$_{2n+1}$—CH=CH— | -nV | —C$_n$H$_{2n}$—CH=CH$_2$ |
| —Vn- | CH$_2$=CH—C$_n$H$_{2n}$— | —Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| —N— | N≡C— | —N | —C≡N |
| —S— | S=C=N— | —S | —N=C=S |
| —F— | F— | —F | —F |
| —CL- | Cl— | —CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO— | CFH$_2$O— | —OM | —OCFH$_2$ |
| -DO— | CF$_2$HO— | —OD | —OCF$_2$H |
| -TO— | CF$_3$O— | —OT | —OCF$_3$ |
| -A- | H—C≡C— | -A | —C≡C—H |

TABLE C-continued

| | End groups | | |
|---|---|---|---|
| | Left-hand group | | Right-hand group |
| -nA- | $C_nH_{2n+1}$—C≡C— | -An | —C≡C—$C_nH_{2n+1}$ |
| -NA- | N≡C—C≡C— | -AN | —C≡C—C≡N |
| | In combination with other abbreviations used | | |
| -...A...- | —C≡C— | -...A... | —C≡C— |
| -...V...- | CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | | | in which n and m each represent integers, and the three dots "..." represent place markers for other abbreviations from this table.

The following table shows illustrative structures together with their abbreviations. These show the meaning of the abbreviations. In addition, they preferably show compounds to be used.

TABLE D

Example structures

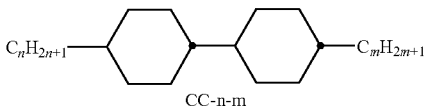
CC-n-m

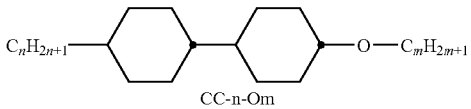
CC-n-Om

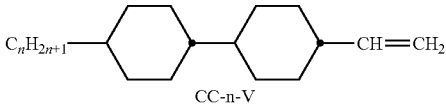
CC-n-V

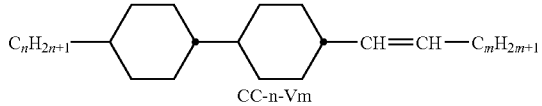
CC-n-Vm

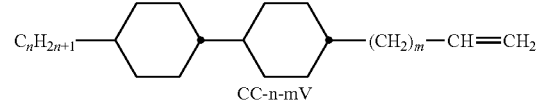
CC-n-mV

CC-n-mVl

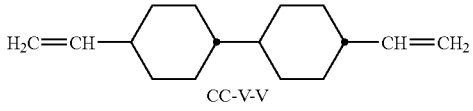
CC-V-V

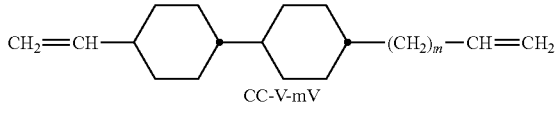
CC-V-mV

TABLE D-continued
Example structures
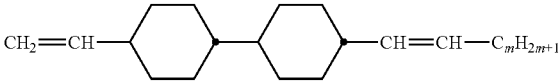
CC-V-Vm
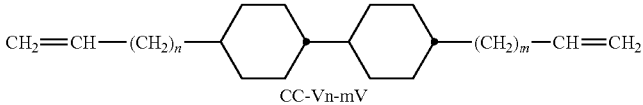
CC-Vn-mV
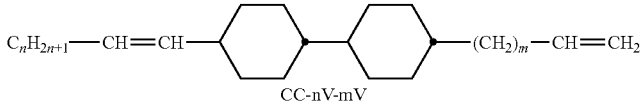
CC-nV-mV
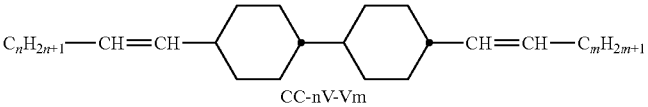
CC-nV-Vm
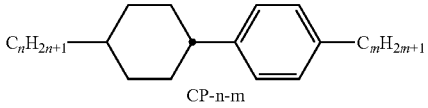
CP-n-m
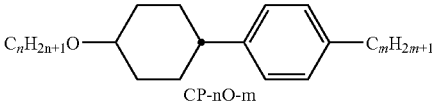
CP-nO-m
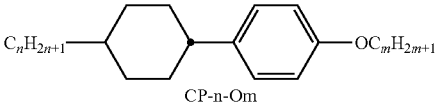
CP-n-Om
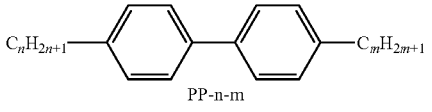
PP-n-m
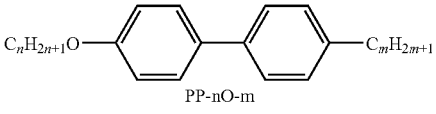
PP-nO-m
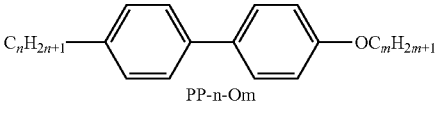
PP-n-Om
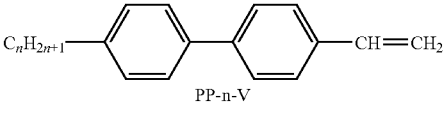
PP-n-V
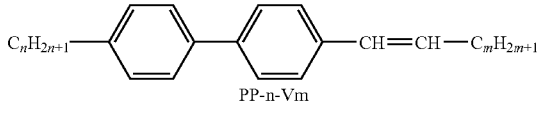
PP-n-Vm
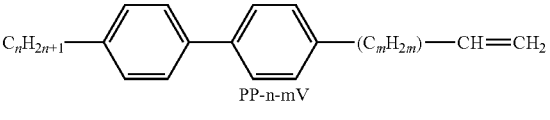
PP-n-mV TABLE D-continued
Example structures
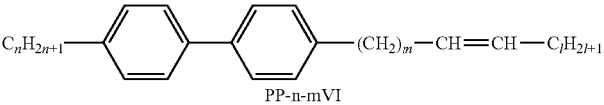
PP-n-mVI
CCP-n-m
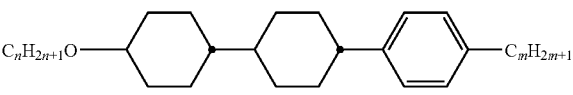
CCP-nO-m
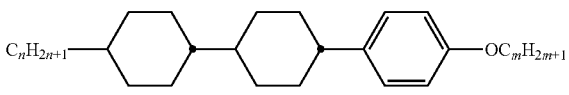
CCP-n-Om
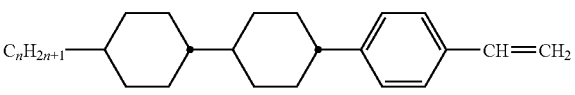
CCP-n-V
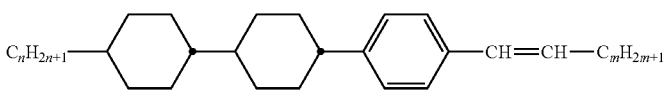
CCP-n-Vm
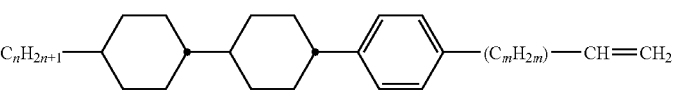
CCP-n-mV
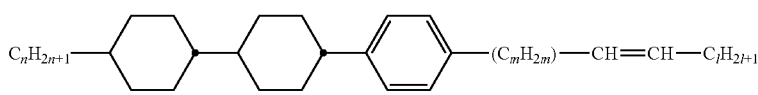
CCP-n-mVI
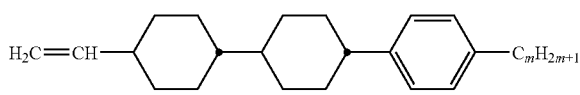
CCP-V-m
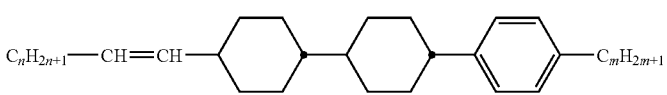
CCP-nV-m
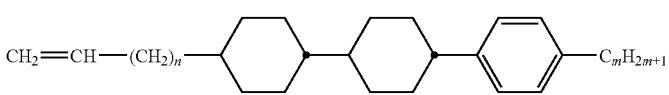
CCP-Vn-m
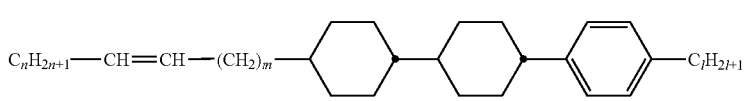
CCP-nVm-l
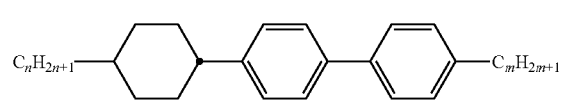
CPP-n-m TABLE D-continued
Example structures
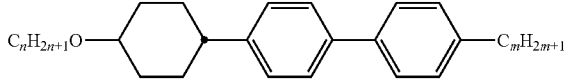
CPP-nO-m
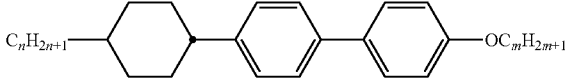
CPP-n-Om
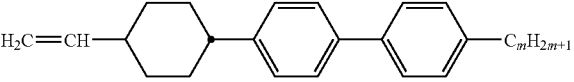
CPP-V-m
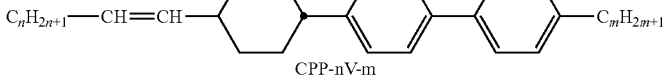
CPP-nV-m
CPP-Vn-m
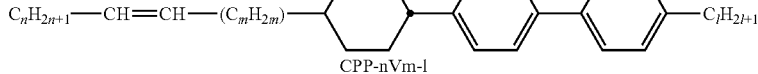
CPP-nVm-l
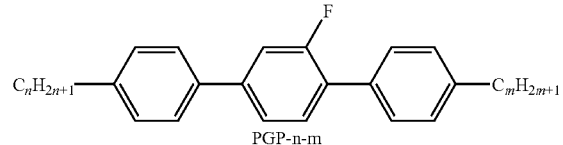
PGP-n-m
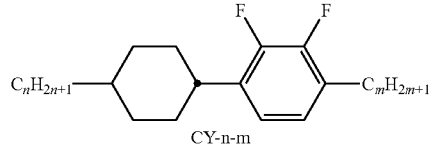
CY-n-m
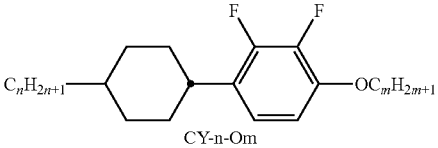
CY-n-Om
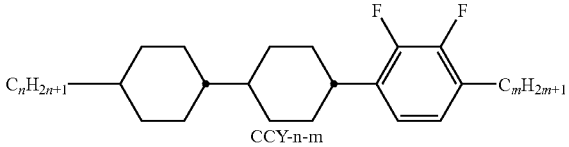
CCY-n-m
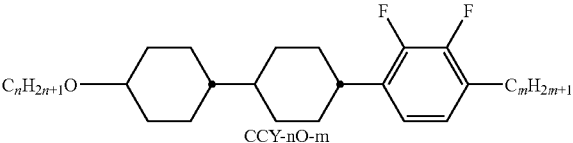
CCY-nO-m TABLE D-continued
Example structures
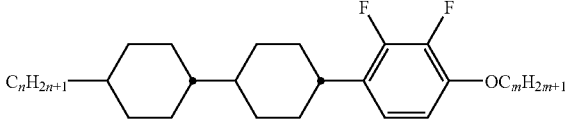
CCY-n-Om
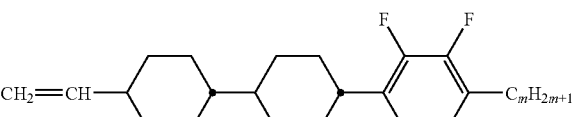
CCY-V-m
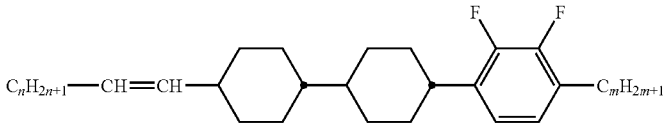
CCY-nV-m
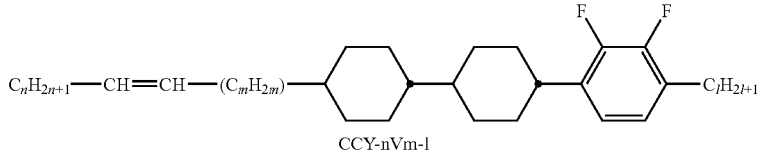
CCY-nVm-l
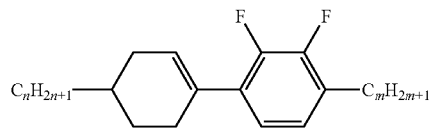
LY-n-m
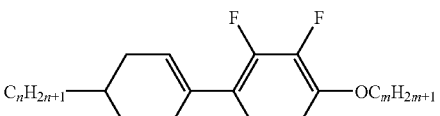
LY-n-Om
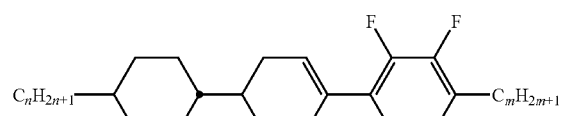
CLY-n-m
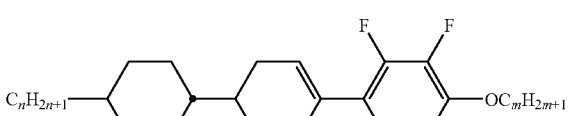
CLY-n-Om TABLE D-continued
Example structures
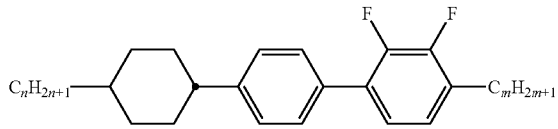
CPY-n-m
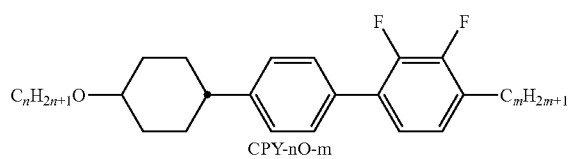
CPY-nO-m
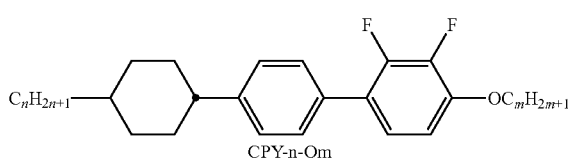
CPY-n-Om
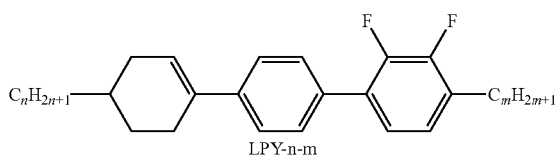
LPY-n-m
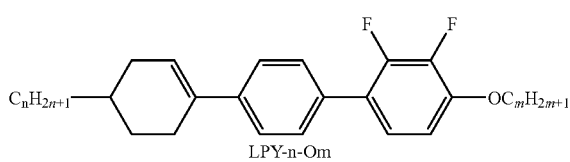
LPY-n-Om
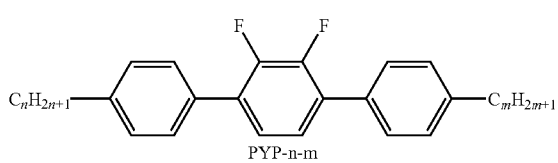
PYP-n-m
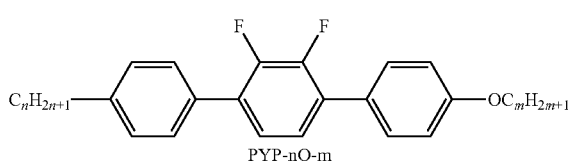
PYP-nO-m
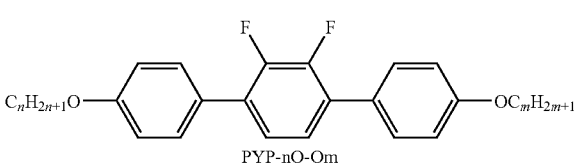
PYP-nO-Om
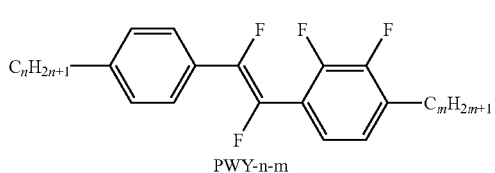
PWY-n-m TABLE D-continued Example structures PWY-n-Om CPWY-n-m CPWY-n-Om PPWY-n-m PPWY-n-Om CK-n-F CNf3-n-Om The media according to the invention preferably comprise two or more, preferably four or more, compounds selected from the compounds from Table D.
The following table, Table E, shows examples of compounds which can be used as stabilisers in the media according to the invention.
TABLE E
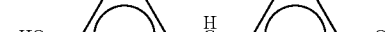
TABLE E-continued
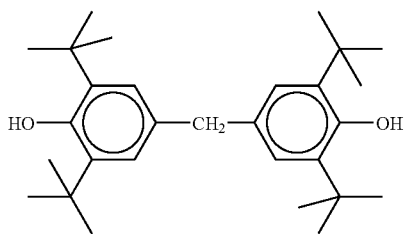
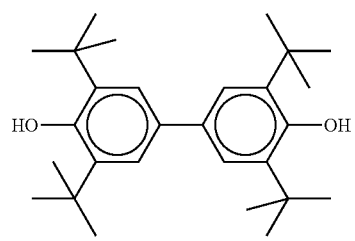
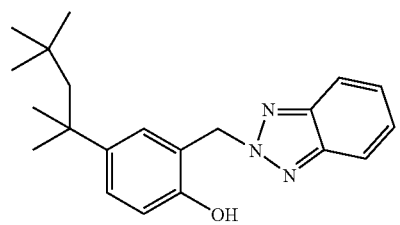
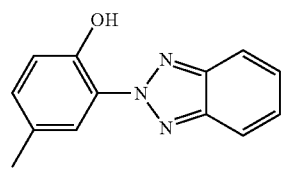
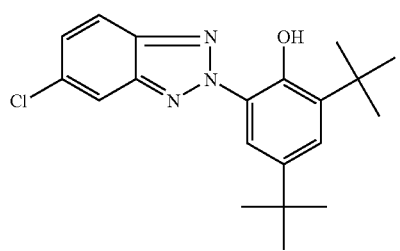

TABLE E-continued
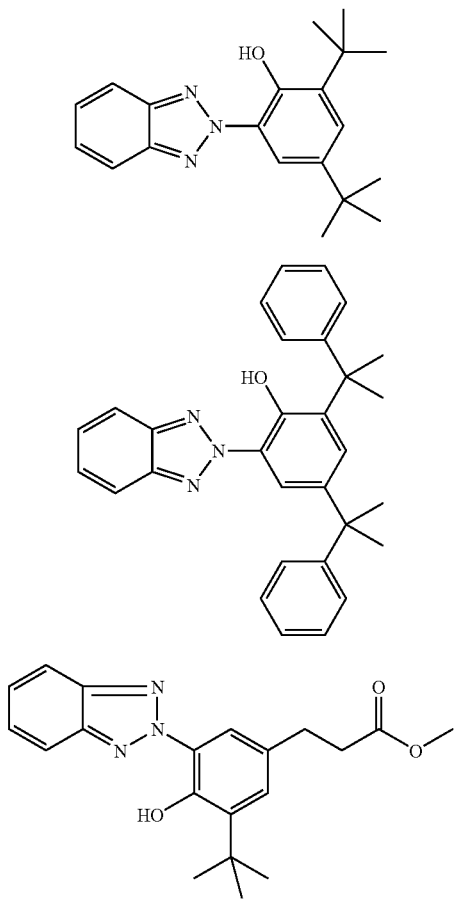
TABLE E-continued
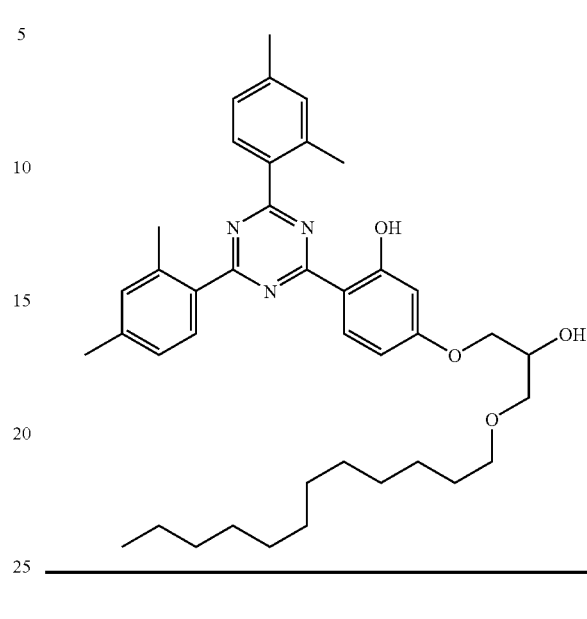
In a preferred embodiment of the present invention, the mesogenic media comprise one or more compounds selected from the compounds from Table E.
The following table, Table F, shows examples of compounds which can be used as chiral dopants in the media according to the invention.
TABLE F
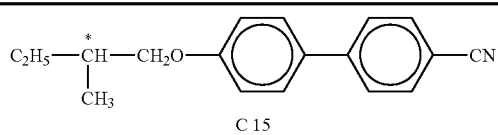
C 15
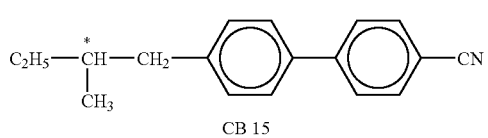
CB 15
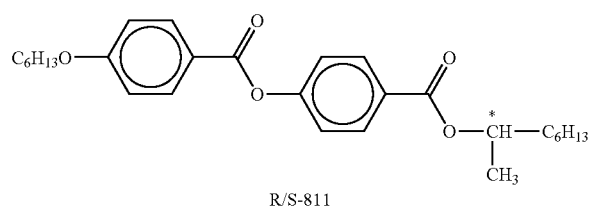
R/S-811
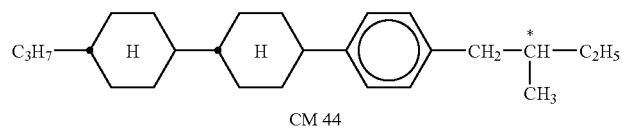
CM 44

TABLE F-continued
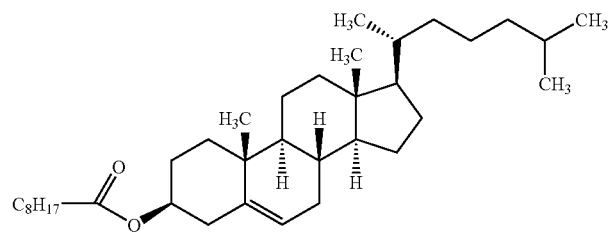
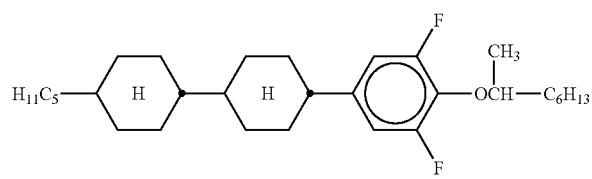
R/S-2011
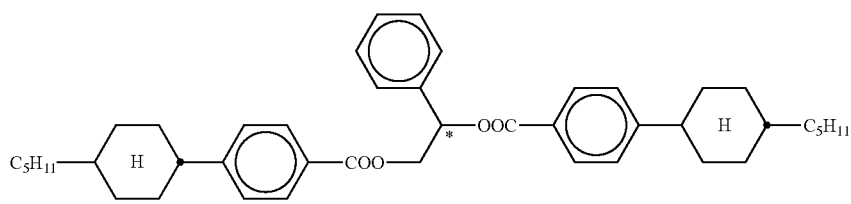
R/S-1011
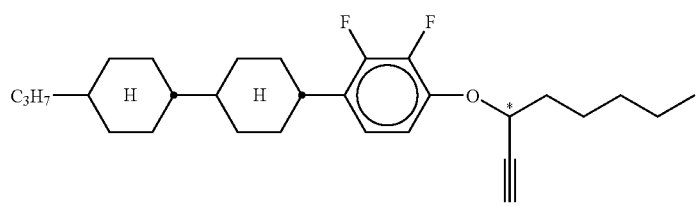
R/S-3011
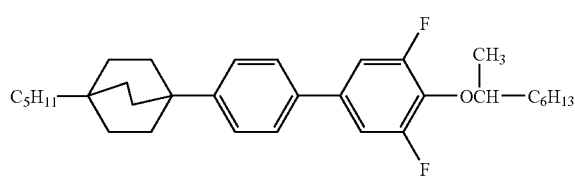
R/S-4011

In a preferred embodiment of the present invention, the mesogenic media comprise one or more compounds selected from the compounds from Table F.

EXAMPLES

The following examples are intended to explain the invention without limiting it. Above and below, percentage data denote per cent by weight. All temperatures are indicated in degrees Celsius. An denotes optical anisotropy (589 nm, 20° C.), Δε denotes the dielectric anisotropy (1 kHz, 20° C.), H.R. denotes the "voltage holding ratio" (at 100° C., after 5 minutes in the oven, 1 V), and $V_0$ denotes the capacitive threshold voltage (at 20° C. and 1 kHz).

SUBSTANCE EXAMPLES

Example 1

1-{(E)-1,2-Difluoro-2-[4-(4-propylcyclohexyl)phenyl]vinyl}-4-ethoxy-2,3-difluorobenzene

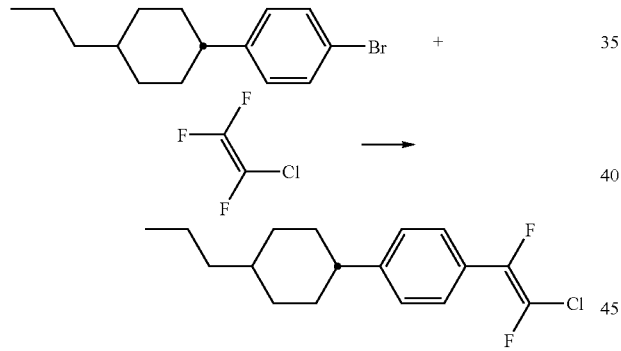

1.1. Step 1

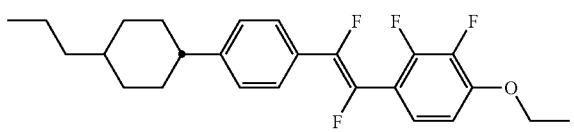

4 g of magnesium are initially introduced in 40 ml of THF, and the suspension is warmed to 45° C. 10% of a solution of 40 g of PCH-3 bromide in 80 ml of THF are added, during which the reaction immediately commences. The remaining solution of the PCH bromide is then added dropwise under gentle reflux. The mixture is cooled to −35° C., and 20 g of chloro-trifluoroethylene are passed in. The mixture is then allowed to warm to RT and is subjected to conventional work-up, giving 31 g of crude product, which is reacted further.

1.2. Step 2

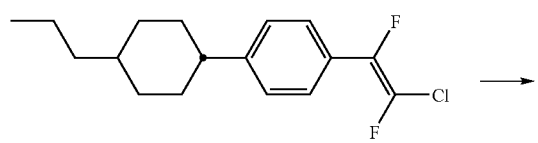

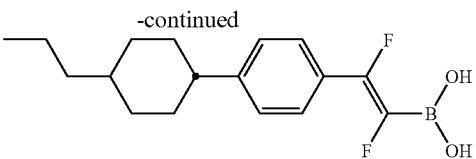

The olefin (31 g) is dissolved in 120 ml of THF, 70 ml of pentane and 70 ml of diethyl ether and cooled to −100° C. 59 ml of 1.6 M BuLi in n-hexane are added dropwise, and the mixture is stirred for one hour. 11 ml of trimethyl borate dissolved in 60 ml of THF, 30 ml of pentane and 30 ml of diethyl ether are added dropwise. After a post-stirring time of one hour, the mixture is warmed and subjected to conventional work-up, giving 14 g of boronic acid.

1.3. Step 3

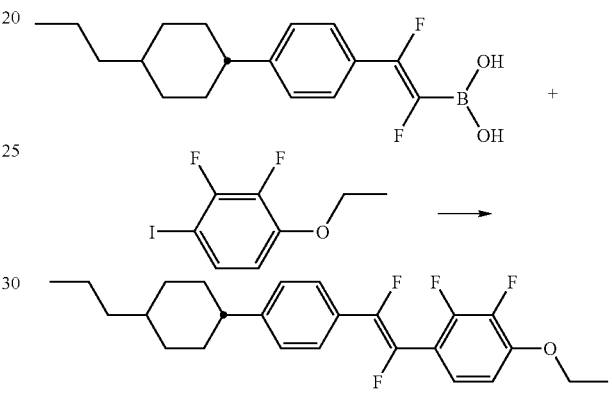

7.8 g of boronic acid, 7.1 g of 4-iodo-2,3-difluoroethoxybenzene, 0.1 g of Pd(OAc)$_2$ and 0.36 g of triphenylphosphine are heated at reflux overnight with 58 ml of isopropanol, 19 ml of sat. Na$_2$CO$_3$ solution and 11 ml of water. The mixture is then subjected to conventional work-up, and the product is crystallised from heptane, giving 3.9 g of the title compound. C 103 N 224.6 I; Δε=−5.8; Δn=0.234.

Examples 2 to 75

The following are prepared analogously to Example 1:

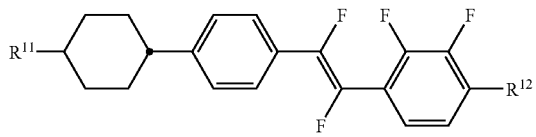

Note: * values extrapolated from 10% solution in ZLI-4792 or ZLI-2857 (Δε).

| No. | $R^{11}$ | $R^{12}$ | Phase sequence T/° C.; physical properties |
|---|---|---|---|
| 1 | n-C$_3$H$_7$ | C$_2$H$_5$O | C 103 N 224.6 I; Δε = −5.8; Δn = 0.234 |
| 2 | CH$_3$ | CH$_3$ | |
| 3 | CH$_3$ | C$_2$H$_5$ | |
| 4 | CH$_3$ | n-C$_3$H$_7$ | |

-continued

| No. | $R^{11}$ | $R^{12}$ | Phase sequence T/° C.; physical properties |
|---|---|---|---|
| 5 | $CH_3$ | $n-C_4H_9$ | |
| 6 | $CH_3$ | $n-C_5H_{11}$ | |
| 7 | $CH_3$ | $n-C_7H_{15}$ | |
| 8 | $CH_3$ | $CH_3O$ | |
| 9 | $CH_3$ | $C_2H_5O$ | |
| 10 | $CH_3$ | $n-C_3H_7O$ | |
| 11 | $CH_3$ | $n-C_4H_9O$ | |
| 12 | $CH_3$ | $CH_2=CH$ | |
| 13 | $CH_3$ | $E-CH_3-CH=CH$ | |
| 15 | $CH_3$ | $CH_2=CH-O$ | |
| 16 | $CH_3$ | $CH_2=CH-CH_2O$ | |
| 17 | $C_2H_5$ | $CH_3$ | |
| 18 | $C_2H_5$ | $C_2H_5$ | |
| 19 | $C_2H_5$ | $n-C_3H_7$ | |
| 20 | $C_2H_5$ | $n-C_4H_9$ | |
| 21 | $C_2H_5$ | $n-C_5H_{11}$ | |
| 22 | $C_2H_5$ | $n-C_6H_{13}$ | |
| 23 | $C_2H_5$ | $n-C_7H_{15}$ | |
| 24 | $C_2H_5$ | $CH_3O$ | |
| 25 | $C_2H_5$ | $C_2H_5O$ | |
| 26 | $C_2H_5$ | $n-C_3H_7O$ | |
| 27 | $C_2H_5$ | $n-C_4H_9O$ | |
| 28 | $C_2H_5$ | $CH_2=CH$ | |
| 29 | $C_2H_5$ | $E-CH_3-CH=CH$ | |
| 30 | $C_2H_5$ | $CH_2=CH-O$ | |
| 31 | $C_2H_5$ | $CH_2=CH-CH_2O$ | |
| 32 | $n-C_3H_7$ | $CH_3$ | C 113 N 192.0 I; $\Delta\epsilon = -2.5; \Delta n = 0.231$ |
| 33 | $n-C_3H_7$ | $C_2H_5$ | |
| 34 | $n-C_3H_7$ | $n-C_3H_7$ | |
| 35 | $n-C_3H_7$ | $n-C_4H_9$ | |
| 36 | $n-C_3H_7$ | $n-C_5H_{11}$ | |
| 37 | $n-C_3H_7$ | $n-C_6H_{13}$ | |
| 38 | $n-C_3H_7$ | $n-C_7H_{15}$ | |
| 39 | $n-C_3H_7$ | $CH_3O$ | |
| 40 | $n-C_3H_7$ | $n-C_3H_7O$ | |
| 41 | $n-C_3H_7$ | $n-C_4H_9O$ | |
| 42 | $n-C_3H_7$ | $CH_2=CH$ | |
| 43 | $n-C_3H_7$ | $E-CH_3-CH=CH$ | |
| 44 | $n-C_3H_7$ | $CH_2=CH-O$ | |
| 45 | $n-C_3H_7$ | $CH_2=CH-CH_2O$ | |
| 46 | $n-C_4H_9$ | $CH_3$ | |
| 47 | $n-C_4H_9$ | $C_2H_5$ | |
| 48 | $n-C_4H_9$ | $n-C_3H_7$ | |
| 49 | $n-C_4H_9$ | $n-C_4H_9$ | |
| 50 | $n-C_4H_9$ | $n-C_5H_{11}$ | |
| 51 | $n-C_4H_9$ | $n-C_6H_{13}$ | |
| 52 | $n-C_4H_9$ | $n-C_7H_{15}$ | |
| 53 | $n-C_4H_9$ | $CH_3O$ | |
| 54 | $n-C_4H_9$ | $C_2H_5O$ | |
| 55 | $n-C_4H_9$ | $n-C_3H_7O$ | |
| 56 | $n-C_4H_9$ | $n-C_4H_9O$ | |
| 57 | $n-C_4H_9$ | $CH_2=CH$ | |
| 58 | $n-C_4H_9$ | $E-CH_3-CH=CH$ | |
| 59 | $n-C_4H_9$ | $CH_2=CH-O$ | |
| 60 | $n-C_4H_9$ | $CH_2=CH-CH_2O$ | |
| 61 | $n-C_5H_9$ | $CH_3$ | C 78 N 185.2 I; $\Delta\epsilon = -2.2; \Delta n = 0.222$ |
| 62 | $n-C_5H_{11}$ | $C_2H_5$ | |
| 63 | $n-C_5H_{11}$ | $n-C_3H_7$ | |
| 64 | $n-C_5H_{11}$ | $n-C_4H_9$ | |
| 65 | $n-C_5H_{11}$ | $n-C_5H_{11}$ | |
| 66 | $n-C_5H_{11}$ | $n-C_6H_{13}$ | |
| 67 | $n-C_5H_{11}$ | $n-C_7H_{15}$ | |
| 68 | $n-C_5H_{11}$ | $CH_3O$ | |
| 69 | $n-C_5H_{11}$ | $C_2H_5O$ | C 70 N 213.5 I; $\Delta\epsilon = -5.3; \Delta n = 0.228$ |
| 70 | $n-C_5H_{11}$ | $n-C_3H_7O$ | |
| 71 | $n-C_5H_{11}$ | $n-C_4H_9O$ | |
| 72 | $n-C_5H_{11}$ | $CH_2=CH$ | |
| 73 | $n-C_5H_{11}$ | $E-CH_3-CH=CH$ | |
| 74 | $n-C_5H_{11}$ | $CH_2=CH-O$ | |
| 75 | $n-C_5H_{11}$ | $CH_2=CH-CH_2O$ | |

Examples 75 to 149

The compounds of the following formula:

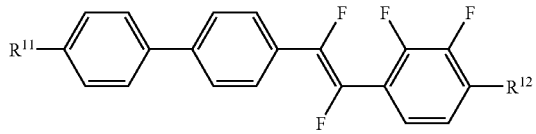

are prepared analogously to Example 1.

Note: * values extrapolated from 10% solution in ZLI-4792 or ZLI-2857 ($\Delta\epsilon$).

| No. | $R^{11}$ | $R^{12}$ | Phase sequence T/° C.; physical properties |
|---|---|---|---|
| 76 | $CH_3$ | $CH_3$ | |
| 77 | $CH_3$ | $C_2H_5$ | |
| 78 | $CH_3$ | $n-C_3H_7$ | |
| 79 | $CH_3$ | $n-C_4H_9$ | |
| 80 | $CH_3$ | $n-C_5H_{11}$ | |
| 81 | $CH_3$ | $n-C_7H_{15}$ | |
| 82 | $CH_3$ | $CH_3O$ | |
| 83 | $CH_3$ | $C_2H_5O$ | |
| 84 | $CH_3$ | $n-C_3H_7O$ | |
| 85 | $CH_3$ | $n-C_4H_9O$ | |
| 86 | $CH_3$ | $CH_2=CH$ | |
| 87 | $CH_3$ | $E-CH_3-CH=CH$ | |
| 88 | $CH_3$ | $CH_2=CH-O$ | |
| 89 | $CH_3$ | $CH_2=CH-CH_2O$ | |
| 90 | $C_2H_5$ | $CH_3$ | |
| 91 | $C_2H_5$ | $C_2H_5$ | |
| 92 | $C_2H_5$ | $n-C_3H_7$ | |
| 93 | $C_2H_5$ | $n-C_4H_9$ | |
| 94 | $C_2H_5$ | $n-C_5H_{11}$ | |
| 95 | $C_2H_5$ | $n-C_6H_{13}$ | |
| 96 | $C_2H_5$ | $n-C_7H_{15}$ | |
| 97 | $C_2H_5$ | $CH_3O$ | |
| 98 | $C_2H_5$ | $C_2H_5O$ | |
| 99 | $C_2H_5$ | $n-C_3H_7O$ | |
| 100 | $C_2H_5$ | $n-C_4H_9O$ | |
| 101 | $C_2H_5$ | $CH_2=CH$ | |
| 102 | $C_2H_5$ | $E-CH_3-CH=CH$ | |
| 103 | $C_2H_5$ | $CH_2=CH-O$ | |
| 104 | $C_2H_5$ | $CH_2=CH-CH_2O$ | |
| 105 | $n-C_3H_7$ | $CH_3$ | |
| 106 | $n-C_3H_7$ | $C_2H_5$ | |
| 107 | $n-C_3H_7$ | $n-C_3H_7$ | |
| 108 | $n-C_3H_7$ | $n-C_4H_9$ | |
| 109 | $n-C_3H_7$ | $n-C_5H_{11}$ | |
| 110 | $n-C_3H_7$ | $n-C_6H_{13}$ | |
| 111 | $n-C_3H_7$ | $n-C_7H_{15}$ | |
| 112 | $n-C_3H_7$ | $CH_3O$ | |
| 113 | $n-C_3H_7$ | $C_2H_5O$ | |
| 114 | $n-C_3H_7$ | $n-C_3H_7O$ | |
| 115 | $n-C_3H_7$ | $n-C_4H_9O$ | |
| 116 | $n-C_3H_7$ | $CH_2=CH$ | |
| 117 | $n-C_3H_7$ | $E-CH_3-CH=CH$ | |
| 118 | $n-C_3H_7$ | $CH_2=CH-O$ | |
| 119 | $n-C_3H_7$ | $CH_2=CH-CH_2O$ | |
| 120 | $n-C_4H_9$ | $CH_3$ | |
| 121 | $n-C_4H_9$ | $C_2H_5$ | |
| 122 | $n-C_4H_9$ | $n-C_3H_7$ | |
| 123 | $n-C_4H_9$ | $n-C_4H_9$ | |
| 124 | $n-C_4H_9$ | $n-C_5H_{11}$ | |
| 125 | $n-C_4H_9$ | $n-C_6H_{13}$ | |
| 126 | $n-C_4H_9$ | $n-C_7H_{15}$ | |
| 127 | $n-C_4H_9$ | $CH_3O$ | |
| 128 | $n-C_4H_9$ | $C_2H_5O$ | |
| 129 | $n-C_4H_9$ | $n-C_3H_7O$ | |
| 130 | $n-C_4H_9$ | $n-C_4H_9O$ | |
| 131 | $n-C_4H_9$ | $CH_2=CH$ | |
| 132 | $n-C_4H_9$ | $E-CH_3-CH=CH$ | |

-continued

| No. | $R^{11}$ | $R^{12}$ | Phase sequence T/° C.; physical properties |
|---|---|---|---|
| 133 | n-$C_4H_9$ | $CH_2$=CH—O | |
| 134 | n-$C_4H_9$ | $CH_2$=CH—$CH_2$O | |
| 135 | n-$C_5H_9$ | $CH_3$ | |
| 136 | n-$C_5H_{11}$ | $C_2H_5$ | |
| 137 | n-$C_5H_{11}$ | n-$C_3H_7$ | |
| 138 | n-$C_5H_{11}$ | n-$C_4H_9$ | |
| 139 | n-$C_5H_{11}$ | n-$C_5H_{11}$ | |
| 140 | n-$C_5H_{11}$ | n-$C_6H_{13}$ | |
| 141 | n-$C_5H_{11}$ | n-$C_7H_{15}$ | |
| 142 | n-$C_5H_{11}$ | $CH_3O$ | |
| 143 | n-$C_5H_{11}$ | $C_2H_5O$ | C 67 $S_C$ 94 N 229.0 I; $\Delta\epsilon = -5.2$; $\Delta n = 0.325$ |
| 144 | n-$C_5H_{11}$ | n-$C_3H_7O$ | C 81 $S_C$ 109 N 215.0 I; $\Delta\epsilon = -4.8$; $\Delta n = 0.309$ |
| 145 | n-$C_5H_{11}$ | n-$C_4H_9O$ | C 70 $S_C$ 102 N 202.3 I; $\Delta\epsilon = -4.9$; $\Delta n = 0.307$ |
| 146 | n-$C_5H_{11}$ | $CH_2$=CH | |
| 147 | n-$C_5H_{11}$ | E-$CH_3$—CH=CH | |
| 148 | n-$C_5H_{11}$ | $CH_2$=CH—O | |
| 149 | n-$C_5H_{11}$ | $CH_2$=CH—$CH_2$O | |

Examples 150 to 225

The following are prepared analogously to Example 1:

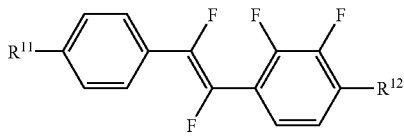

Note: * values extrapolated from 10% solution in ZLI-4792 or ZLI-2857 ($\Delta\epsilon$).

| No. | $R^{11}$ | $R^{12}$ | Phase sequence T/° C.; physical properties |
|---|---|---|---|
| 150 | $CH_3$ | $CH_3$ | |
| 151 | $CH_3$ | $C_2H_5$ | |
| 152 | $CH_3$ | n-$C_3H_7$ | |
| 153 | $CH_3$ | n-$C_4H_9$ | |
| 154 | $CH_3$ | n-$C_5H_{11}$ | |
| 155 | $CH_3$ | n-$C_7H_{15}$ | |
| 156 | $CH_3$ | $CH_3O$ | |
| 157 | $CH_3$ | $C_2H_5O$ | |
| 158 | $CH_3$ | n-$C_3H_7O$ | |
| 159 | $CH_3$ | n-$C_4H_9O$ | |
| 160 | $CH_3$ | $CH_2$=CH | |
| 161 | $CH_3$ | E-$CH_3$—CH=CH | |
| 162 | $CH_3$ | $CH_2$=CH—O | |
| 163 | $CH_3$ | $CH_2$=CH—$CH_2$O | |
| 164 | $C_2H_5$ | $CH_3$ | |
| 165 | $C_2H_5$ | $C_2H_5$ | |
| 166 | $C_2H_5$ | n-$C_3H_7$ | |
| 167 | $C_2H_5$ | n-$C_4H_9$ | |
| 168 | $C_2H_5$ | n-$C_5H_{11}$ | |
| 169 | $C_2H_5$ | n-$C_6H_{13}$ | |
| 170 | $C_2H_5$ | n-$C_7H_{15}$ | |
| 171 | $C_2H_5$ | $CH_3O$ | |
| 172 | $C_2H_5$ | $C_2H_5O$ | |
| 173 | $C_2H_5$ | n-$C_3H_7O$ | |
| 174 | $C_2H_5$ | n-$C_4H_9O$ | |
| 175 | $C_2H_5$ | $CH_2$=CH | |
| 176 | $C_2H_5$ | E-$CH_3$—CH=CH | |
| 177 | $C_2H_5$ | $CH_2$=CH—O | |
| 178 | $C_2H_5$ | $CH_2$=CH—$CH_2$O | |

-continued

| No. | $R^{11}$ | $R^{12}$ | Phase sequence T/° C.; physical properties |
|---|---|---|---|
| 179 | n-$C_3H_7$ | $CH_3$ | |
| 180 | n-$C_3H_7$ | $C_2H_5$ | |
| 181 | n-$C_3H_7$ | n-$C_3H_7$ | |
| 182 | n-$C_3H_7$ | n-$C_4H_9$ | |
| 183 | n-$C_3H_7$ | n-$C_5H_{11}$ | |
| 184 | n-$C_3H_7$ | n-$C_6H_{13}$ | |
| 185 | n-$C_3H_7$ | n-$C_7H_{15}$ | |
| 186 | n-$C_3H_7$ | $CH_3O$ | |
| 187 | n-$C_3H_7$ | $C_2H_5O$ | C 75 N (66.2) I; $\Delta\epsilon = -7.0$; $\Delta n = 0.226$ |
| 188 | n-$C_3H_7$ | n-$C_3H_7O$ | |
| 189 | n-$C_3H_7$ | n-$C_4H_9O$ | |
| 190 | n-$C_3H_7$ | $CH_2$=CH | |
| 191 | n-$C_3H_7$ | E-$CH_3$—CH=CH | |
| 192 | n-$C_3H_7$ | $CH_2$=CH—O | |
| 193 | n-$C_3H_7$ | $CH_2$=CH—$CH_2$O | |
| 194 | n-$C_4H_9$ | $CH_3$ | |
| 195 | n-$C_4H_9$ | $C_2H_5$ | |
| 196 | n-$C_4H_9$ | n-$C_3H_7$ | |
| 197 | n-$C_4H_9$ | n-$C_4H_9$ | |
| 198 | n-$C_4H_9$ | n-$C_5H_{11}$ | |
| 199 | n-$C_4H_9$ | n-$C_6H_{13}$ | |
| 201 | n-$C_4H_9$ | n-$C_7H_{15}$ | |
| 202 | n-$C_4H_9$ | $CH_3O$ | |
| 203 | n-$C_4H_9$ | $C_2H_5O$ | |
| 204 | n-$C_4H_9$ | n-$C_3H_7O$ | |
| 205 | n-$C_4H_9$ | n-$C_4H_9O$ | |
| 206 | n-$C_4H_9$ | $CH_2$=CH | |
| 207 | n-$C_4H_9$ | E-$CH_3$—CH=CH | |
| 208 | n-$C_4H_9$ | $CH_2$=CH—O | |
| 209 | n-$C_4H_9$ | $CH_2$=CH—$CH_2$O | |
| 210 | n-$C_5H_9$ | $CH_3$ | |
| 211 | n-$C_5H_{11}$ | $C_2H_5$ | |
| 212 | n-$C_5H_{11}$ | n-$C_3H_7$ | |
| 213 | n-$C_5H_{11}$ | n-$C_4H_9$ | |
| 214 | n-$C_5H_{11}$ | n-$C_5H_{11}$ | |
| 215 | n-$C_5H_{11}$ | n-$C_6H_{13}$ | |
| 216 | n-$C_5H_{11}$ | n-$C_7H_{15}$ | |
| 217 | n-$C_5H_{11}$ | $CH_3O$ | |
| 218 | n-$C_5H_{11}$ | $C_2H_5O$ | |
| 219 | n-$C_5H_{11}$ | n-$C_3H_7O$ | |
| 220 | n-$C_5H_{11}$ | n-$C_4H_9O$ | |
| 221 | n-$C_5H_{11}$ | $CH_2$=CH | |
| 222 | n-$C_5H_{11}$ | E-$CH_3$—CH=CH | |
| 223 | n-$C_5H_{11}$ | $CH_2$=CH—O | |
| 224 | n-$C_5H_{11}$ | $CH_2$=CH—$CH_2$O | |
| 225 | $C_2H_5O$ | $C_2H_5O$ | C 91 N 115.6 I; $\Delta\epsilon = -7.1$; $\Delta n = 0.266$ |

Examples 226 to 299

The following are prepared analogously to Example 1:

Note. * values extrapolated from 10% solution in ZLI-4792 or ZLI-2857 ($\Delta\epsilon$).

| No. | $R^{11}$ | $R^{12}$ | Phase sequence T/° C.; physical properties |
|---|---|---|---|
| 226 | $CH_3$ | $CH_3$ | |
| 227 | $CH_3$ | $C_2H_5$ | |

-continued

| No. | $R^{11}$ | $R^{12}$ | Phase sequence T/° C.; physical properties |
|---|---|---|---|
| 228 | $CH_3$ | $n-C_3H_7$ | |
| 229 | $CH_3$ | $n-C_4H_9$ | |
| 230 | $CH_3$ | $n-C_5H_{11}$ | |
| 231 | $CH_3$ | $n-C_7H_{15}$ | |
| 232 | $CH_3$ | $CH_3O$ | |
| 233 | $CH_3$ | $C_2H_5O$ | |
| 234 | $CH_3$ | $n-C_3H_7O$ | |
| 235 | $CH_3$ | $n-C_4H_9O$ | |
| 236 | $CH_3$ | $CH_2=CH$ | |
| 237 | $CH_3$ | $E-CH_3-CH=CH$ | |
| 238 | $CH_3$ | $CH_2=CH-O$ | |
| 239 | $CH_3$ | $CH_2=CH-CH_2O$ | |
| 240 | $C_2H_5$ | $CH_3$ | |
| 241 | $C_2H_5$ | $C_2H_5$ | |
| 242 | $C_2H_5$ | $n-C_3H_7$ | |
| 243 | $C_2H_5$ | $n-C_4H_9$ | |
| 244 | $C_2H_5$ | $n-C_5H_{11}$ | |
| 245 | $C_2H_5$ | $n-C_6H_{13}$ | |
| 246 | $C_2H_5$ | $n-C_7H_{15}$ | |
| 247 | $C_2H_5$ | $CH_3O$ | |
| 248 | $C_2H_5$ | $C_2H_5O$ | |
| 249 | $C_2H_5$ | $n-C_3H_7O$ | |
| 250 | $C_2H_5$ | $n-C_4H_9O$ | |
| 251 | $C_2H_5$ | $CH_2=CH$ | |
| 252 | $C_2H_5$ | $E-CH_3-CH=CH$ | |
| 253 | $C_2H_5$ | $CH_2=CH-O$ | |
| 254 | $C_2H_5$ | $CH_2=CH-CH_2O$ | |
| 255 | $n-C_3H_7$ | $CH_3$ | |
| 256 | $n-C_3H_7$ | $C_2H_5$ | |
| 257 | $n-C_3H_7$ | $n-C_3H_7$ | |
| 258 | $n-C_3H_7$ | $n-C_4H_9$ | |
| 259 | $n-C_3H_7$ | $n-C_5H_{11}$ | |
| 260 | $n-C_3H_7$ | $n-C_6H_{13}$ | |
| 261 | $n-C_3H_7$ | $n-C_7H_{15}$ | |
| 262 | $n-C_3H_7$ | $CH_3O$ | |
| 263 | $n-C_3H_7$ | $C_2H_5O$ | |
| 264 | $n-C_3H_7$ | $n-C_3H_7O$ | |
| 265 | $n-C_3H_7$ | $n-C_4H_9O$ | |
| 266 | $n-C_3H_7$ | $CH_2=CH$ | |
| 267 | $n-C_3H_7$ | $E-CH_3-CH=CH$ | |
| 268 | $n-C_3H_7$ | $CH_2=CH-O$ | |
| 269 | $n-C_3H_7$ | $CH_2=CH-CH_2O$ | |
| 270 | $n-C_4H_9$ | $CH_3$ | |
| 271 | $n-C_4H_9$ | $C_2H_5$ | |
| 272 | $n-C_4H_9$ | $n-C_3H_7$ | |
| 273 | $n-C_4H_9$ | $n-C_4H_9$ | |
| 274 | $n-C_4H_9$ | $n-C_5H_{11}$ | |
| 275 | $n-C_4H_9$ | $n-C_6H_{13}$ | |
| 276 | $n-C_4H_9$ | $n-C_7H_{15}$ | |
| 277 | $n-C_4H_9$ | $CH_3O$ | |
| 278 | $n-C_4H_9$ | $C_2H_5O$ | |
| 279 | $n-C_4H_9$ | $n-C_3H_7O$ | |
| 280 | $n-C_4H_9$ | $n-C_4H_9O$ | |
| 281 | $n-C_4H_9$ | $CH_2=CH$ | |
| 282 | $n-C_4H_9$ | $E-CH_3-CH=CH$ | |
| 283 | $n-C_4H_9$ | $CH_2=CH-O$ | |
| 284 | $n-C_4H_9$ | $CH_2=CH-CH_2O$ | |
| 285 | $n-C_5H_9$ | $CH_3$ | |
| 286 | $n-C_5H_{11}$ | $C_2H_5$ | |
| 287 | $n-C_5H_{11}$ | $n-C_3H_7$ | |
| 288 | $n-C_5H_{11}$ | $n-C_4H_9$ | |
| 289 | $n-C_5H_{11}$ | $n-C_5H_{11}$ | |
| 290 | $n-C_5H_{11}$ | $n-C_6H_{13}$ | |
| 291 | $n-C_5H_{11}$ | $n-C_7H_{15}$ | |
| 292 | $n-C_5H_{11}$ | $CH_3O$ | |
| 293 | $n-C_5H_{11}$ | $C_2H_5O$ | C 124 N 339.7 I; $\Delta\epsilon = -1.6; \Delta n = 0.335$ |
| 294 | $n-C_5H_{11}$ | $n-C_3H_7O$ | |
| 295 | $n-C_5H_{11}$ | $n-C_4H_9O$ | |
| 296 | $n-C_5H_{11}$ | $CH_2=CH$ | |
| 297 | $n-C_5H_{11}$ | $E-CH_3-CH=CH$ | |
| 298 | $n-C_5H_{11}$ | $CH_2=CH-O$ | |
| 299 | $n-C_5H_{11}$ | $CH_2=CH-CH_2O$ | |

MIXTURE EXAMPLES

Liquid-crystalline mixtures are prepared and investigated for their applicational properties.

Example M 1

A liquid-crystal mixture having the composition indicated in the following table was prepared and investigated. It has the properties likewise shown in the table.

| Composition | | |
|---|---|---|
| Compound | | |
| No. | Abbreviation | Conc./% by wt. |
| 1 | CY-3-O4 | 10.0 |
| 2 | CY-5-O4 | 15.0 |
| 3 | CPY-2-O2 | 10.0 |
| 4 | PYP-2-4 | 13.0 |
| 5 | CC-3-V1 | 12.0 |
| 6 | CC-5-V | 5.0 |
| 7 | CPP-3-2 | 10.0 |
| 8 | PWY-3-O2 | 15.0 |
| 9 | PPWY-5-O3 | 5.0 |
| 10 | PPWY-5-O4 | 5.0 |
| Σ | | 100.0 |

| Physical properties | |
|---|---|
| T (N, I) = | 82.0° C. |
| $n_e$ (20° C., 589 nm) = | 1.652 |
| $\Delta n$ (20° C., 589 nm) = | 0.161 |
| $\epsilon_\perp$ (20° C., 1 kHz) = | 3.8 |
| $\Delta\epsilon$ (20° C., 1 kHz) = | −3.8 |
| $k_1$ (20° C.) = | 14.6 pN |
| $k_1/k_3$ (20° C.) = | 1.05 |
| $\gamma_1$ (20° C.) = | 189 mPa · s |
| $V_0$ (20° C.) = | 2.13 |

The liquid-crystal medium has very good applicational properties and can be employed for various VA technologies, such as MVA, PVA, ASV and also for IPS.

Example M 2

A liquid-crystal mixture having the composition indicated in the following table was prepared and investigated. It has the properties likewise shown in the table.

| Composition | | |
|---|---|---|
| Compound | | |
| No. | Abbreviation | Conc./% by wt |
| 1 | CY-3-O4 | 10.0 |
| 2 | CY-5-O4 | 5.0 |
| 3 | CPY-2-O2 | 10.0 |
| 4 | PYP-2-4 | 13.0 |
| 5 | CC-3-V1 | 12.0 |
| 6 | CC-5-V | 5.0 |
| 7 | CPP-3-2 | 10.0 |
| 8 | CK-3-F | 5.0 |
| 9 | CK-4-F | 5.0 |
| 10 | PWY-3-O2 | 15.0 |
| 11 | PPWY-5-O3 | 5.0 |
| 12 | PPWY-5-O4 | 5.0 |
| Σ | | 100.0 |

-continued

| | Physical properties | |
|---|---|---|
| | T (N, I) = | 86.5° C. |
| | Δn (20° C., 589 nm) = | 0.161 |
| | Δε (20° C., 1 kHz) = | −4.0 |
| | γ₁ (20° C.) = | 188 mPa·s |
| | V₀ (20° C.) = | 2.08 V |

The liquid-crystal medium has very good applicational properties and can be employed for various VA technologies, such as MVA, PVA, ASV and also for IPS.

Example M 3

A liquid-crystal mixture having the composition indicated in the following table was prepared and investigated. It has the properties likewise shown in the table.

| Composition | | |
|---|---|---|
| Compound | | |
| No. | Abbreviation | Conc./% by wt |
| 1 | CY-3-O4 | 20.0 |
| 2 | CY-5-O2 | 8.0 |
| 3 | CPY-2-O2 | 12.0 |
| 4 | CPY-3-O2 | 12.0 |
| 5 | CC-3-V1 | 8.0 |
| 6 | CC-5-V | 20.0 |
| 7 | CPP-3-2 | 10.0 |
| 8 | PWY-2O-O2 | 10.0 |
| Σ | | 100.0 |

| Physical properties | |
|---|---|
| T (N, I) = | 76.0° C. |
| $n_e$ (20° C., 589 nm) = | 1.606 |
| Δn (20° C., 589 nm) = | 0.121 |
| $\epsilon_\perp$ (20° C., 1 kHz) = | 3.7 |
| Δε (20° C., 1 kHz) = | −3.7 |
| $k_1$ (20° C.) = | 14.1 pN |
| $k_1/k_3$ (20° C.) = | 1.07 |
| γ₁ (20° C.) = | 134 mPa·s |
| V₀ (20° C.) = | 2.13 V |

The liquid-crystal medium has very good applicational properties and can be employed for various VA technologies, such as MVA, PVA, ASV and also for IPS.

Example M 4

A liquid-crystal mixture having the composition indicated in the following table was prepared and investigated. It has the properties likewise shown in the table.

| Composition | | |
|---|---|---|
| Compound | | |
| No. | Abbreviation | Conc./% by wt |
| 1 | CY-3-O4 | 20.0 |
| 2 | CY-5-O2 | 8.0 |
| 3 | CPY-2-O2 | 12.0 |
| 4 | CPY-3-O2 | 12.0 |
| 5 | CC-3-V1 | 8.0 |
| 6 | CC-5-V | 10.0 |

-continued

| | | |
|---|---|---|
| 7 | CP-5-3 | 10.0 |
| 9 | CPP-3-2 | 10.0 |
| 8 | CPWY-3-O2 | 10.0 |
| Σ | | 100.0 |

| Physical properties | |
|---|---|
| T (N, I) = | 77.5° C. |
| $n_e$ (20° C., 589 nm) = | 1.607 |
| Δn (20° C., 589 nm) = | 0.121 |
| $\epsilon_\perp$ (20° C., 1 kHz) = | 3.6 |
| Δε (20° C., 1 kHz) = | −3.5 |
| $k_1$ (20° C.) = | 13.9 pN |
| $k_1/k_3$ (20° C.) = | 1.12 |
| γ₁ (20° C.) = | 151 mPa·s |
| V₀ (20° C.) = | 2.22 V |

The liquid-crystal medium has very good applicational properties and can be employed for various VA technologies, such as MVA, PVA, ASV and also for IPS.

Example M 5

A liquid-crystal mixture having the composition indicated in the following table was prepared and investigated. It has the properties likewise shown in the table.

| Composition | | |
|---|---|---|
| Compound | | |
| No. | Abbreviation | Conc./% by wt |
| 1 | CY-3-O4 | 15.0 |
| 2 | CY-5-O2 | 3.0 |
| 3 | CCY-3-O2 | 6.0 |
| 4 | CCY-4-O2 | 6.0 |
| 5 | CCY-5-O2 | 4.0 |
| 6 | CCY-3-O3 | 6.0 |
| 7 | CPY-2-O2 | 11.0 |
| 8 | CPY-3-O2 | 11.0 |
| 9 | PYP-2-4 | 4.0 |
| 10 | CC-5-V | 14.0 |
| 11 | PWY-3-O2 | 20.0 |
| Σ | | 100.0 |

| Physical properties | |
|---|---|
| T (N, I) = | 90.0° C. |
| $n_e$ (20° C., 589 nm) = | 1.626 |
| Δn (20° C., 589 nm) = | 0.146 |
| $\epsilon_\perp$ (20° C., 1 kHz) = | 4.1 |
| Δε (20° C., 1 kHz) = | −5.9 |
| $k_1$ (20° C.) = | 15.3 pN |
| $k_1/k_3$ (20° C.) = | 1.15 |
| γ₁ (20° C.) = | 250 mPa·s |
| V₀ (20° C.) = | 1.83 V |

The liquid-crystal medium has very good applicational properties and can be employed for various VA technologies, such as MVA, PVA, ASV and also for IPS.

Example M 6

A liquid-crystal mixture having the composition indicated in the following table was prepared and investigated. It has the properties likewise shown in the table.

| \multicolumn{3}{c}{Composition} | | |
|---|---|---|
| \multicolumn{3}{c}{Compound} | | |
| No. | Abbreviation | Conc./% by wt |
| 1 | CY-3-O4 | 15.0 |
| 2 | CY-5-O2 | 12.0 |
| 3 | CY-5-O4 | 12.0 |
| 3 | CCY-3-O2 | 8.0 |
| 4 | CCY-3-O3 | 7.0 |
| 5 | CPY-2-O2 | 10.0 |
| 6 | CPY-3-O2 | 8.0 |
| 7 | CC-5-V | 10.0 |
| 8 | PPWY-5-O3 | 9.0 |
| 9 | PPWY-5-O4 | 9.0 |
| Σ | | 100.0 |

| Physical properties | |
|---|---|
| T (N, I) = | 92.0° C. |
| $n_e$ (20° C., 589 nm) = | 1.622 |
| Δn (20° C., 589 nm) = | 0.139 |
| $\epsilon_\perp$ (20° C., 1 kHz) = | 4.2 |
| Δε (20° C., 1 kHz) = | −6.0 |
| $k_1$ (20° C.) = | 15.5 pN |
| $k_1/k_3$ (20° C.) = | 1.03 |
| $Y_1$ (20° C.) = | 289 mPa·s |
| $V_0$ (20° C.) = | 1.72 V |

The liquid-crystal medium has very good applicational properties and can be employed for various VA technologies, such as MVA, PVA, ASV and also for IPS.

Example M 7

A liquid-crystal mixture having the composition indicated in the following table was prepared and investigated. It has the properties likewise shown in the table.

| \multicolumn{3}{c}{Composition} | | |
|---|---|---|
| \multicolumn{3}{c}{Compound} | | |
| No. | Abbreviation | Conc./% by wt |
| 1 | CY-3-O4 | 10.0 |
| 2 | CY-5-O2 | 12.0 |
| 3 | CY-5-O4 | 7.0 |
| 4 | CCY-3-O2 | 8.0 |
| 5 | CCY-3-O3 | 7.0 |
| 6 | CPY-2-O2 | 10.0 |
| 7 | CPY-3-O2 | 8.0 |
| 8 | CC-5-V | 10.0 |
| 9 | CNf3-3-O2 | 5.0 |
| 10 | CNf3-3-O4 | 5.0 |
| 11 | PPWY-5-O3 | 9.0 |
| 12 | PPWY-5-O4 | 9.0 |
| Σ | | 100.0 |

| Physical properties | |
|---|---|
| T (N, I) = | 99.0° C. |
| Δn (20° C., 589 nm) = | 0.140 |
| Δε (20° C., 1 kHz) = | −6.3 |
| $Y_1$ (20° C.) = | 312 mPa·s |

The liquid-crystal medium has very good applicational properties and can be employed for various VA technologies, such as MVA, PVA, ASV and also for IPS.

Example M 8

A liquid-crystal mixture having the composition indicated in the following table was prepared and investigated. It has the properties likewise shown in the table.

| \multicolumn{3}{c}{Composition} | | |
|---|---|---|
| \multicolumn{3}{c}{Compound} | | |
| No. | Abbreviation | Conc./% by wt |
| 1 | CPY-2-1 | 10.0 |
| 2 | PYP-2-3 | 20.0 |
| 3 | PYP-2-4 | 20.0 |
| 4 | CC-3-V | 15.0 |
| 5 | CC-3-4 | 12.0 |
| 6 | PWY-3-O2 | 23.0 |
| Σ | | 100.0 |

| Physical properties | |
|---|---|
| T (N, I) = | 95.0° C. |
| $n_e$ (20° C., 589 nm) = | 1.675 |
| Δn (20° C., 589 nm) = | 0.174 |
| $\epsilon_\perp$ (20° C., 1 kHz) = | 3.6 |
| Δε (20° C., 1 kHz) = | −2.4 |
| $k_1$ (20° C.) = | 12.8 pN |
| $k_1/k_3$ (20° C.) = | 1.05 |

The liquid-crystal medium has very good applicational properties and can be employed for various VA technologies, such as MVA, PVA, ASV and also for IPS.

The preceding examples can be repeated with similar success by substituting the generically or specifically described reactants and/or operating conditions of this invention for those used in the preceding examples.

The entire disclosures of all applications, patents and publications, cited herein and of corresponding German application No. 102006058608.5, filed Dec. 11, 2006, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A compound of formula I

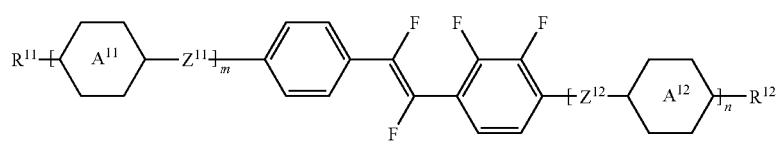

in which
R$^{11}$ and R$^{12}$ each, independently of one another, denote H, halogen, —CN, —SCN, —SF$_5$, —CF$_3$, —CHF$_2$, —CH$_2$F, —OCF$_3$, —OCHF$_2$, an alkyl group having 1 to 15 C atoms which is monosubstituted by CN or CF$_3$ or at least monosubstituted by halogen, in which optionally, one or more CH$_2$ groups, in each case independently of one another, are replaced by —O—, —S—, —CH═CH—, —CF═CF—, —CF═CH—, —CH═CF—,

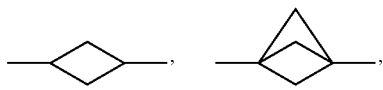

—CO—, —CO—O—, —O—CO— or —O—CO—O— in such a way that neither O nor S atoms are linked directly to one another,

and

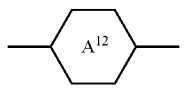

each, independently of one another and, if present more than once, also these independently of one another, denote
(a) a trans-1,4-cyclohexylene radical, in which optionally, one or two non-adjacent CH$_2$ groups are replaced by —O— and/or —S—,
(b) a 1,4-cyclohexenylene radical,
(c) a 1,4-phenylene radical, in which optionally, one or two non-adjacent CH groups are replaced by N,
(d) naphthalene-2,6-diyl, decahydronaphthalene-2,6-diyl or 1,2,3,4-tetrahydronaphthalene-2,6-diyl, or
(e) 1,4-bicyclo[2.2.2]octylene, 1,3-bicyclo[1.1.1]pentylene or spiro[3.3]heptane-2,6-diyl,
where in
(a) and (b), one or more —CH$_2$— groups, independently of one another, are optionally replaced by a —CHF— or —CF$_2$— group, and in
(c) and (d), one or more —CH═ groups, independently of one another, are optionally replaced by —C(F)═, —C(Cl)═, —C(Br)═, —C(CN)═, —C(CH$_3$)═, —C(CH$_2$F)═, —C(CHF$_2$)═, —C(OCH$_3$)═, —C(OCHF$_2$)═ or —C(OCF$_3$)═, Z$^{11}$ and Z$^{12}$ each, independently of one another and, if present more than once, also these independently of one another, denote a single bond, —CH$_2$—CH$_2$—, —CF$_2$—CH$_2$—, —CH$_2$—CF$_2$—, —CF$_2$—CF$_2$—, —CH═CH—, —CF═CF—, —CF═CH—, —CH═CF—, —C≡C—, —COO—, —OCO—, —CH$_2$O—, —OCH$_2$—, —CF$_2$O—, or —OCF$_2$—, or a combination of two of these groups, where no two O atoms are bonded to one another, and
m and n each independently denote 0, 1 or 2, and
(m+n) denotes 1 or 2.

2. A compound according to claim 1, which is of formula I-2 or I-3

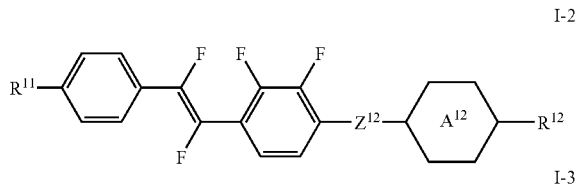

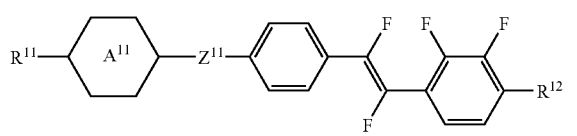

in which R$^{11}$, R$^{12}$, Z$^{11}$, Z$^{12}$,

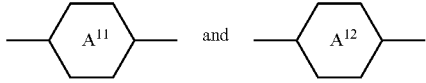

are defined as for the compounds of formula I.

3. A compound according to claim 1, wherein Z$^{11}$ and Z$^{12}$ both denote a single bond.

4. A compound according to claim 2, which is of formula I-2.

5. A compound according to claim 2, which is of formula I-3.

6. A compound according to claim 1, wherein (m+n) denotes 1.

7. A compound according to claim 1, wherein m denotes 1.

8. A liquid-crystal medium, comprising a compound of formula I according to claim 1.

9. A liquid-crystal medium according to claim 8, which has a nematic phase.

10. A liquid-crystal medium according to claim 8, comprising a dielectrically negative compound of formula II

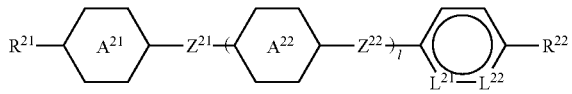

II in which

R$^{21}$ and R$^{22}$ each, independently of one another, denote H, halogen, —CN, —SCN, —SF$_5$, —CF$_3$, —CHF$_2$, —CH$_2$F, —OCF$_3$, —OCHF$_2$, an alkyl group having 1 to 15 C atoms which is monosubstituted by CN or CF$_3$ or at least mono-substituted by halogen, in which optionally, one or more CH$_2$ groups, in each case independently of one another, are replaced by —O—, —S—, —CH=CH—, —CF=CF—, —CF=CH—, —CH=CF—,

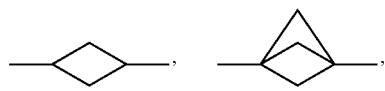

—CO—, —CO—O—, —O—CO— or —O—CO—O— in such a way that neither O nor S atoms are linked directly to one another, Z$^{21}$ and Z$^{22}$ each, independently of one another, if present more than once, also these independently of one another, denote a single bond, —CH$_2$—CH$_2$—, —CF$_2$—CH$_2$—, —CH$_2$—CF$_2$—, —CF$_2$—CF$_2$—, —CH=CH—, —CF=CF—, —CF=CH—, —CH=CF—, —C≡C—, —COO—, —OCO—, —CH$_2$O—, —OCH$_2$—, —CF$_2$O—, or —OCF$_2$—, or a combination of two of these groups, where no two O atoms are bonded to one another,

and

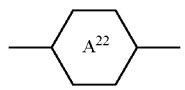

each, independently of one another, denote

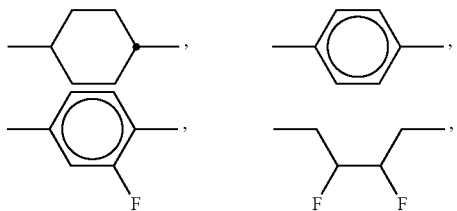

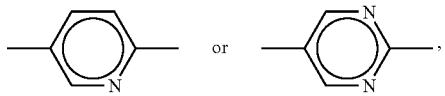

L$^{21}$ and L$^{22}$ both denote C—F or one of the two denotes N and the other denotes C—F, and l denotes 0 or 1.

11. A liquid-crystal medium according to claim 10, comprising a compound of formula II-1

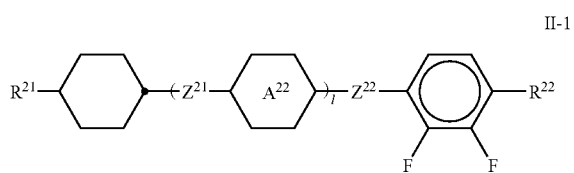

II-1 in which R$^{21}$, R$^{22}$, Z$^{12}$, Z$^{22}$,

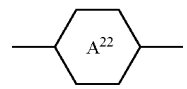

and l are defined as for the compounds of formula II.

12. An electro-optical display containing a liquid-crystal medium according to claim 8.

13. A display according to claim 12, which is a VAN LCD.

14. A process for preparing a compound according to claim 1, comprising coupling a 1,2-difluorostyreneboronic acid to a haloaromatic compound with palladium catalysis.

15. A process for preparing a liquid-crystal medium according to claim 8, comprising mixing a compound of formula I with one or more further compounds.

16. A process for preparing an electro-optical display, comprising introducing a liquid-crystal medium according to claim 8 between two substrates.

17. A compound according to claim 1, wherein R$^{11}$ is methyl or pentyl.

18. A compound according to claim 1, wherein R$^{11}$ and R$^{12}$ each, independently of one another, denote H, halogen, —CN, —SCN, —SF$_5$, —CF$_3$, —CHF$_2$, —CH$_2$F, —OCF$_3$, —OCHF$_2$, an alkyl group having 2 to 5 C atoms which is monosubstituted by CN or CF$_3$ or at least monosubstituted by halogen, in which optionally, one or more CH$_2$ groups, in each case independently of one another, are replaced by —O—, —S—, —CH=CH—, —CF=CF—, —CF=CH—, —CH=CF—,

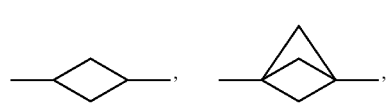

—CO—, —CO—O—, —O—CO— or —O—CO—O— in such a way that neither O nor S atoms are linked directly to one another.

19. A compound according to claim 1, wherein R$^{11}$ is C$_1$ to C$_5$ alkyl or C$_2$ to C$_5$ 1-E alkenyl.

20. A liquid-crystal medium according to claim 8, which has a nematic phase from at least −20° C. to 80° C.

21. A liquid-crystal medium according to claim 8, which has a nematic phase from at least −40° C. to 100° C.

22. A compound which is one of the compounds 1 to 149 or 226 to 299

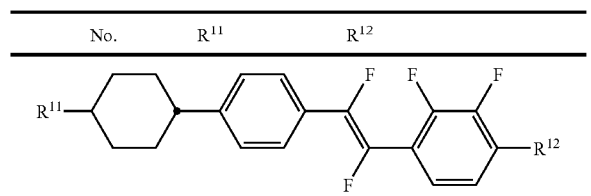

wherein

| No. | R¹¹ | R¹² |
|---|---|---|
| 1 | n-C₃H₇ | C₂H₅O |
| 2 | CH₃ | CH₃ |
| 3 | CH₃ | C₂H₅ |
| 4 | CH₃ | n-C₃H₇ |
| 5 | CH₃ | n-C₄H₉ |
| 6 | CH₃ | n-C₅H₁₁ |
| 7 | CH₃ | n-C₇H₁₅ |
| 8 | CH₃ | CH₃O |
| 9 | CH₃ | C₂H₅O |
| 10 | CH₃ | n-C₃H₇O |
| 11 | CH₃ | n-C₄H₉O |
| 12 | CH₃ | CH₂=CH |
| 13 | CH₃ | E-CH₃—CH=CH |
| 15 | CH₃ | CH₂=OH—O |
| 16 | CH₃ | CH₂=CH—CH₂O |
| 17 | C₂H₅ | CH₃ |
| 18 | C₂H₅ | C₂H₅ |
| 19 | C₂H₅ | n-C₃H₇ |
| 20 | C₂H₅ | n-C₄H₉ |
| 21 | C₂H₅ | n-C₅H₁₁ |
| 22 | C₂H₅ | n-C₆H₁₃ |
| 23 | C₂H₅ | n-C₇H₁₅ |
| 24 | C₂H₅ | CH₃O |
| 25 | C₂H₅ | C₂H₅O |
| 26 | C₂H₅ | n-C₃H₇O |
| 27 | C₂H₅ | n-C₄H₉O |
| 28 | C₂H₅ | CH₂=CH |
| 29 | C₂H₅ | E-CH₃—CH=CH |
| 30 | C₂H₅ | CH₂=CH—O |
| 31 | C₂H₅ | CH₂=CH—CH₂O |
| 32 | n-C₃H₇ | CH₃ |
| 33 | n-C₃H₇ | C₂H₅ |
| 34 | n-C₃H₇ | n-C₃H₇ |
| 35 | n-C₃H₇ | n-C₄H₉ |
| 36 | n-C₃H₇ | n-C₅H₁₁ |
| 37 | n-C₃H₇ | n-C₆H₁₃ |
| 38 | n-C₃H₇ | n-C₇H₁₅ |
| 39 | n-C₃H₇ | CH₃O |
| 40 | n-C₃H₇ | n-C₃H₇O |
| 41 | n-C₃H₇ | n-C₄H₉O |
| 42 | n-C₃H₇ | CH₂=CH |
| 43 | n-C₃H₇ | E-CH₃—CH=CH |
| 44 | n-C₃H₇ | CH₂=CH—O |
| 45 | n-C₃H₇ | CH₂=CH—CH₂O |
| 46 | n-C₄H₉ | CH₃ |
| 47 | n-C₄H₉ | C₂H₅ |
| 48 | n-C₄H₉ | n-C₃H₇ |
| 49 | n-C₄H₉ | n-C₄H₉ |
| 50 | n-C₄H₉ | n-C₅H₁₁ |
| 51 | n-C₄H₉ | n-C₆H₁₃ |
| 52 | n-C₄H₉ | n-C₇H₁₅ |
| 53 | n-C₄H₉ | CH₃O |
| 54 | n-C₄H₉ | C₂H₅O |
| 55 | n-C₄H₉ | n-C₃H₇O |
| 56 | n-C₄H₉ | n-C₄H₉O |
| 57 | n-C₄H₉ | CH₂=CH |
| 58 | n-C₄H₉ | E-CH₃—CH=CH |
| 59 | n-C₄H₉ | CH₂=CH—O |
| 60 | n-C₄H₉ | CH₂=CH—CH₂O |
| 61 | n-C₅H₉ | CH₃ |
| 62 | n-C₅H₁₁ | C₂H₅ |
| 63 | n-C₅H₁₁ | n-C₃H₇ |
| 64 | n-C₅H₁₁ | n-C₄H₉ |

-continued

| No. | R¹¹ | R¹² |
|---|---|---|
| 65 | n-C₅H₁₁ | n-C₅H₁₁ |
| 66 | n-C₅H₁₁ | n-C₆H₁₃ |
| 67 | n-C₅H₁₁ | n-C₇H₁₅ |
| 68 | n-C₅H₁₁ | CH₃O |
| 69 | n-C₅H₁₁ | C₂H₅O |
| 70 | n-C₅H₁₁ | n-C₃H₇O |
| 71 | n-C₅H₁₁ | n-C₄H₉O |
| 72 | n-C₅H₁₁ | CH₂=CH |
| 73 | n-C₅H₁₁ | E-CH₃—CH=CH |
| 74 | n-C₅H₁₁ | CH₂=CH—O |
| 75 | n-C₅H₁₁ | CH₂=CH—CH₂O | or

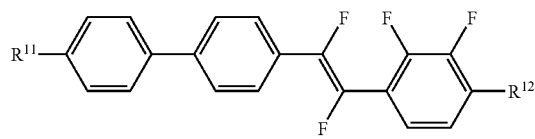

wherein

| No. | R¹¹ | R¹² |
|---|---|---|
| 76 | CH₃ | CH₃ |
| 77 | CH₃ | C₂H₅ |
| 78 | CH₃ | n-C₃H₇ |
| 79 | CH₃ | n-C₄H₉ |
| 80 | CH₃ | n-C₅H₁₁ |
| 81 | CH₃ | n-C₇H₁₅ |
| 82 | CH₃ | CH₃O |
| 83 | CH₃ | C₂H₅O |
| 84 | CH₃ | n-C₃H₇O |
| 85 | CH₃ | n-C₄H₉O |
| 86 | CH₃ | CH₂=CH |
| 87 | CH₃ | E-CH₃—CH=CH |
| 88 | CH₃ | CH₂=CH—O |
| 89 | CH₃ | CH₂=CH—CH₂O |
| 90 | C₂H₅ | CH₃ |
| 91 | C₂H₅ | C₂H₅ |
| 92 | C₂H₅ | n-C₃H₇ |
| 93 | C₂H₅ | n-C₄H₉ |
| 94 | C₂H₅ | n-C₅H₁₁ |
| 95 | C₂H₅ | n-C₆H₁₃ |
| 96 | C₂H₅ | n-C₇H₁₅ |
| 97 | C₂H₅ | CH₃O |
| 98 | C₂H₅ | C₂H₅O |
| 99 | C₂H₅ | n-C₃H₇O |
| 100 | C₂H₅ | n-C₄H₉O |
| 101 | C₂H₅ | CH₂=CH |
| 102 | C₂H₅ | E-CH₃—CH=CH |
| 103 | C₂H₅ | CH₂=CH—O |
| 104 | C₂H₅ | CH₂=CH—CH₂O |
| 105 | n-C₃H₇ | CH₃ |
| 106 | n-C₃H₇ | C₂H₅ |
| 107 | n-C₃H₇ | n-C₃H₇ |
| 108 | n-C₃H₇ | n-C₄H₉ |
| 109 | n-C₃H₇ | n-C₅H₁₁ |
| 110 | n-C₃H₇ | n-C₆H₁₃ |
| 111 | n-C₃H₇ | n-C₇H₁₅ |
| 112 | n-C₃H₇ | CH₃O |
| 113 | n-C₃H₇ | C₂H₅O |
| 114 | n-C₃H₇ | n-C₃H₇O |
| 115 | n-C₃H₇ | n-C₄H₉O |
| 116 | n-C₃H₇ | CH₂=CH |
| 117 | n-C₃H₇ | E-CH₃—CH=CH |
| 118 | n-C₃H₇ | CH₂=CH—O |
| 119 | n-C₃H₇ | CH₂=CH—CH₂O |
| 120 | n-C₄H₉ | CH₃ |
| 121 | n-C₄H₉ | C₂H₅ |
| 122 | n-C₄H₉ | n-C₃H₇ |
| 123 | n-C₄H₉ | n-C₄H₉ |
| 124 | n-C₄H₉ | n-C₅H₁₁ |
| 125 | n-C₄H₉ | n-C₆H₁₃ |
| 126 | n-C₄H₉ | n-C₇H₁₅ |
| 127 | n-C₄H₉ | CH₃O |
| 128 | n-C₄H₉ | C₂H₅O |
| 129 | n-C₄H₉ | n-C₃H₇O |
| 130 | n-C₄H₉ | n-C₄H₉O |

-continued

| No. | $R^{11}$ | $R^{12}$ |
|---|---|---|
| 131 | n-$C_4H_9$ | $CH_2$=CH |
| 132 | n-$C_4H_9$ | E-$CH_3$—CH=CH |
| 133 | n-$C_4H_9$ | $CH_2$=CH—O |
| 134 | n-$C_4H_9$ | $CH_2$=CH—$CH_2$O |
| 135 | n-$C_5H_9$ | $CH_3$ |
| 136 | n-$C_5H_{11}$ | $C_2H_5$ |
| 137 | n-$C_5H_{11}$ | n-$C_3H_7$ |
| 138 | n-$C_5H_{11}$ | n-$C_4H_9$ |
| 139 | n-$C_5H_{11}$ | n-$C_5H_{11}$ |
| 140 | n-$C_5H_{11}$ | n-$C_6H_{13}$ |
| 141 | n-$C_5H_{11}$ | n-$C_7H_{15}$ |
| 142 | n-$C_5H_{11}$ | $CH_3O$ |
| 143 | n-$C_5H_{11}$ | $C_2H_5O$ |
| 144 | n-$C_5H_{11}$ | n-$C_3H_7O$ |
| 145 | n-$C_5H_{11}$ | n-$C_4H_9O$ |
| 146 | n-$C_5H_{11}$ | $CH_2$=CH |
| 147 | n-$C_5H_{11}$ | E-$CH_3$—CH=CH |
| 148 | n-$C_5H_{11}$ | $CH_2$=CH—O |
| 149 | n-$C_5H_{11}$ | $CH_2$=CH—$CH_2$O | or

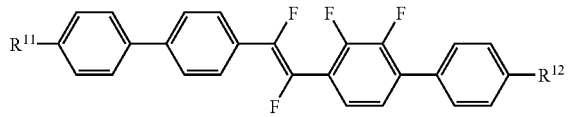

wherein

| No. | $R^{11}$ | $R^{12}$ |
|---|---|---|
| 226 | $CH_3$ | $CH_3$ |
| 227 | $CH_3$ | $C_2H_5$ |
| 228 | $CH_3$ | n-$C_3H_7$ |
| 229 | $CH_3$ | n-$C_4H_9$ |
| 230 | $CH_3$ | n-$C_5H_{11}$ |
| 231 | $CH_3$ | n-$C_7H_{15}$ |
| 232 | $CH_3$ | $CH_3O$ |
| 233 | $CH_3$ | $C_2H_5O$ |
| 234 | $CH_3$ | n-$C_3H_7O$ |
| 235 | $CH_3$ | n-$C_4H_9O$ |
| 236 | $CH_3$ | $CH_2$=CH |
| 237 | $CH_3$ | E-$CH_3$—CH=CH |
| 238 | $CH_3$ | $CH_2$=CH—O |
| 239 | $CH_3$ | $CH_2$=CH—$CH_2$O |
| 240 | $C_2H_5$ | $CH_3$ |
| 241 | $C_2H_5$ | $C_2H_5$ |
| 242 | $C_2H_5$ | n-$C_3H_7$ |
| 243 | $C_2H_5$ | n-$C_4H_9$ |
| 244 | $C_2H_5$ | n-$C_5H_{11}$ |
| 245 | $C_2H_5$ | n-$C_6H_{13}$ |
| 246 | $C_2H_5$ | n-$C_7H_{15}$ |
| 247 | $C_2H_5$ | $CH_3O$ |
| 248 | $C_2H_5$ | $C_2H_5O$ |
| 249 | $C_2H_5$ | n-$C_3H_7O$ |
| 250 | $C_2H_5$ | n-$C_4H_9O$ |
| 251 | $C_2H_5$ | $CH_2$=CH |
| 252 | $C_2H_5$ | E-$CH_3$—CH=CH |
| 253 | $C_2H_5$ | $CH_2$=CH—O |
| 254 | $C_2H_5$ | $CH_2$=CH—$CH_2$O |
| 255 | n-$C_3H_7$ | $CH_3$ |

-continued

| No. | $R^{11}$ | $R^{12}$ |
|---|---|---|
| 256 | n-$C_3H_7$ | $C_2H_5$ |
| 257 | n-$C_3H_7$ | n-$C_3H_7$ |
| 258 | n-$C_3H_7$ | n-$C_4H_9$ |
| 259 | n-$C_3H_7$ | n-$C_5H_{11}$ |
| 260 | n-$C_3H_7$ | n-$C_6H_{13}$ |
| 261 | n-$C_3H_7$ | n-$C_7H_{15}$ |
| 262 | n-$C_3H_7$ | $CH_3O$ |
| 263 | n-$C_3H_7$ | $C_2H_5O$ |
| 264 | n-$C_3H_7$ | n-$C_3H_7O$ |
| 265 | n-$C_3H_7$ | n-$C_4H_9O$ |
| 266 | n-$C_3H_7$ | $CH_2$=CH |
| 267 | n-$C_3H_7$ | E-$CH_3$—CH=CH |
| 268 | n-$C_3H_7$ | $CH_2$=CH—O |
| 269 | n-$C_3H_7$ | $CH_2$=CH—$CH_2$O |
| 270 | n-$C_4H_9$ | $CH_3$ |
| 271 | n-$C_4H_9$ | $C_2H_5$ |
| 272 | n-$C_4H_9$ | n-$C_3H_7$ |
| 273 | n-$C_4H_9$ | n-$C_4H_9$ |
| 274 | n-$C_4H_9$ | n-$C_5H_{11}$ |
| 275 | n-$C_4H_9$ | n-$C_6H_{13}$ |
| 276 | n-$C_4H_9$ | n-$C_7H_{15}$ |
| 277 | n-$C_4H_9$ | $CH_3O$ |
| 278 | n-$C_4H_9$ | $C_2H_5O$ |
| 279 | n-$C_4H_9$ | n-$C_3H_7O$ |
| 280 | n-$C_4H_9$ | n-$C_4H_9O$ |
| 281 | n-$C_4H_9$ | $CH_2$=CH |
| 282 | n-$C_4H_9$ | E-$CH_3$—CH=CH |
| 283 | n-$C_4H_9$ | $CH_2$=CH—O |
| 284 | n-$C_4H_9$ | $CH_2$=CH—$CH_2$O |
| 285 | n-$C_5H_9$ | $CH_3$ |
| 286 | n-$C_5H_{11}$ | $C_2H_5$ |
| 287 | n-$C_5H_{11}$ | n-$C_3H_7$ |
| 288 | n-$C_5H_{11}$ | n-$C_4H_9$ |
| 289 | n-$C_5H_{11}$ | n-$C_5H_{11}$ |
| 290 | n-$C_5H_{11}$ | n-$C_6H_{13}$ |
| 291 | n-$C_5H_{11}$ | n-$C_7H_{15}$ |
| 292 | n-$C_5H_{11}$ | $CH_3O$ |
| 293 | n-$C_5H_{11}$ | $C_2H_5O$ |
| 294 | n-$C_5H_{11}$ | n-$C_3H_7O$ |
| 295 | n-$C_5H_{11}$ | n-$C_4H_9O$ |
| 296 | n-$C_5H_{11}$ | $CH_2$=CH |
| 297 | n-$C_5H_{11}$ | E-$CH_3$—CH=CH |
| 298 | n-$C_5H_{11}$ | $CH_2$=CH—O |
| 299 | n-$C_5H_{11}$ | $CH_2$=CH—$CH_2$O. |

23. A compound according to claim 22, which is one of the compounds 7, 22, 23, 32, 38, 51, 52, 66, 67, 81, 95, 96, 110, 111, 125, 126, 140, 141, 231, 245, 246, 260, 262, 275, 276, 290, or 291.

24. A compound according to claim 22, which is one of the compounds 1-6, 8-21, 24-31, 33-37, 39-50, 53-65, 68-80, 82-94, 97-109, 112-124, 127-139, 142-149, 226-230, 232-244, 247-259, 261, 263-274, 277-289, or 292-299.

25. A liquid-crystal medium, comprising a compound according to claim 22.

* * * * *